(12) United States Patent
Sugahara et al.

(10) Patent No.: US 11,074,370 B2
(45) Date of Patent: Jul. 27, 2021

(54) INFORMATION PROCESSING SYSTEM, INFORMATION PROCESSING DEVICE, AND METHOD FOR CONTROLLING INFORMATION PROCESSING DEVICE

(71) Applicant: MegaChips Corporation, Osaka (JP)

(72) Inventors: Takahiko Sugahara, Osaka (JP); Naoki Matsuyama, Osaka (JP); Harunobu Kishida, Osaka (JP)

(73) Assignee: MEGACHIPS CORPORATION, Osaka (JP)

( * ) Notice: Subject to any disclaimer, the term of this patent is extended or adjusted under 35 U.S.C. 154(b) by 262 days.

(21) Appl. No.: 16/296,249

(22) Filed: Mar. 8, 2019

(65) Prior Publication Data
US 2019/0278945 A1    Sep. 12, 2019

(30) Foreign Application Priority Data

Mar. 9, 2018 (JP) ................................ 2018-042625
Feb. 27, 2019 (JP) ............................. JP2019-035028

(51) Int. Cl.
| | |
|---|---|
| *G06F 21/72* | (2013.01) |
| *G06F 21/79* | (2013.01) |
| *H04L 9/06* | (2006.01) |
| *G06F 21/75* | (2013.01) |
| *H04L 9/00* | (2006.01) |

(52) U.S. Cl.
CPC ............ *G06F 21/72* (2013.01); *G06F 21/755* (2017.08); *G06F 21/79* (2013.01); *H04L 9/004* (2013.01); *H04L 9/06* (2013.01)

(58) Field of Classification Search
CPC ........ G06F 21/72; G06F 21/79; G06F 21/755; G06F 1/305; H04L 9/06; G06Q 20/382
See application file for complete search history.

(56) References Cited

U.S. PATENT DOCUMENTS 10,474,846 B1 * 11/2019 Rezayee .................... G06F 1/28
2011/0296198 A1 * 12/2011 Motoyama ............ G06F 21/602
713/189

OTHER PUBLICATIONS

"Countermeasures Against Fault Attacks on Software implemented AES: Effectiveness and Cost"—Barenghi, DEI—Dipartimento di Elettronica e Informazione Politecnico di Milano, Oct. 24, 2010 https://dl.acm.org/doi/pdf/10.1145/1873548.1873555 (Year: 2010).*

(Continued)

*Primary Examiner* — Randy A Scott
(74) *Attorney, Agent, or Firm* — Xsensus LLP

(57) ABSTRACT

A host device includes a power supply unit configured to supply power to a SoC, a current measurement circuit configured to measure a current from the power supply unit to the SoC, a detection unit configured to detect a power supply glitch in the host device, on the basis of a result of current measurement by the current measurement circuit, and a controller configured to suspend transmission of encrypted command from the host device to the memory device if the detection unit detects a power supply glitch in the host device.

21 Claims, 12 Drawing Sheets

(56) References Cited

OTHER PUBLICATIONS

"Practical Optical Fault Injection on Secure Microcontrollers"—Woudenberg et al, Workshop on Fault Diagnosis and Tolerance in Cryptography, Sep. 28, 2011 https://www.riscure.com/uploads/2017/09/Practical-optical-fault-injection-on-secure-microcontrollers.pdf(Year: 2011).*

Bearnghi et al., "Countermeasures Against Fault Attacks on Software Implemented AES: Effectiveness and Cost", 10 pages.

Noudenberg et al., "Practical optical fault injection on secure microcontrollers", Workshop on Fault Diagnosis and Tolerance in Cryptography, Sep. 28, 2011, Nara, Japan, 9 pages.

* cited by examiner

INFORMATION PROCESSING SYSTEM, INFORMATION PROCESSING DEVICE, AND METHOD FOR CONTROLLING INFORMATION PROCESSING DEVICE

CROSS REFERENCE TO RELATED APPLICATIONS

The present application is based on, and claims priority from Japanese Patent Application Serial Numbers JP2018-042625 and JP2019-035028, the disclosure of which is hereby incorporated by reference herein in its entirety.

BACKGROUND

Technical Field

The present disclosure relates to an information processing system, an information processing device, and a method for controlling an information processing device.

Related Art

Encryption methods currently in use are perceived to be computationally secure against cryptanalysis. Actually providing a cryptographic module with an encryption device, however, may result in leaks caused by providing the module, such as power consumption and processing time. Threats of side channel attacks are increasing, in an attempt to illicitly obtain secret information such as secret keys by observing these operational conditions by various physical means.

There have been reports on fault attacks as one of examples of side channel attacks that intentionally induce a misoperation in cryptosystems to deduce secret information by analyzing outputs in the misoperation. Examples of specific methods of such fault attacks include inducing a misoperation in a cryptosystem by instantaneously applying an abnormal voltage (power supply glitch) to a supply voltage for driving the cryptosystem.

Various countermeasures against fault attacks have been proposed, such as random delays to make analysis difficult by intentionally shifting timing at which encryption is started (Jasper G J. van Woudenberg et al., "Practical optical fault injection on secure microcontrollers" [online], searched on the Internet on Feb. 14, 2018, <https://www.riscure.com/uploads/2017/09/Practical-optical-fault-injection-on-secure-microcontrollers.pdf>), and duplication by repeating the same cryptographic algorithm on an input (Alessandro Barenghi et al., "Countermeasures against fault attacks on software implemented AES" [online], searched on the Internet on Feb. 14, 2018, <https://www.researchgate.net/publication/221148201_Countermeasures_against_fault_attacks_on_software_implemented_AES>).

SUMMARY

An information processing system includes an information processing device including first circuitry configured to perform first encryption-decryption, and an appurtenance device configured to be connected to the information processing device and including second circuitry configured to perform second encryption-decryption. The information processing device further includes a first power supply circuit configured to supply power to the first circuitry, and a first current measurement circuit configured to measure a current from the first power supply circuit to the first circuitry. The first circuitry is further configured to detect a power supply glitch in the information processing device based on a result of current measurement by the first current measurement circuit, and if a power supply glitch in the information processing device is detected, suspend transmission of encrypted data from the information processing device to the appurtenance device.

An information processing system includes an information processing device including first circuitry configured to perform first encryption-decryption, and an appurtenance device configured to be connected to the information processing device and including second circuitry configured to perform second encryption-decryption. The information processing device further includes a power supply circuit configured to supply power to the appurtenance device, and a current measurement circuit configured to measure a current from the power supply circuit to the appurtenance device. The first circuitry is further configured to detect a power supply glitch in the appurtenance device based on a result of current measurement by the current measurement circuit, and if a power supply glitch in the appurtenance device is detected, suspend transmission of encrypted data from the appurtenance device to the information processing device.

An information processing system includes an information processing device including first circuitry configured to perform first encryption-decryption, and an appurtenance device configured to be connected to the information processing device and including second circuitry configured to perform second encryption-decryption. The information processing device further includes a power supply circuit configured to supply power to the first circuitry and the appurtenance device, and a current measurement circuit configured to measure a current from the power supply circuit to the first circuitry and the appurtenance device. The first circuitry is further configured to detect a power supply glitch in the information processing device and the appurtenance device based on a result of current measurement by the current measurement circuit, and if a power supply glitch in the information processing device is detected, suspend transmission of encrypted data from the information processing device to the appurtenance device, and if a power supply glitch in the appurtenance device is detected, suspend transmission of encrypted data from the appurtenance device to the information processing device.

A method for controlling an information processing device, the information processing device including circuitry configured to perform first encryption-decryption, and a power supply circuit, and being configured to receive an appurtenance device configured to perform second encryption-decryption, includes supplying power from the power supply circuit to the circuitry, measuring a current from the power supply circuit to the circuitry, detecting a power supply glitch in the information processing device based on a result of the measuring the current, and suspending transmission of encrypted data from the information processing device to the appurtenance device if a power supply glitch in the information processing device is detected in the detecting.

A method for controlling an information processing device, the information processing device including circuitry configured to perform first encryption-decryption and a power supply circuit, and being configured to receive an appurtenance device configured to perform second encryption-decryption, includes supplying power from the power supply circuit to the appurtenance device, measuring a current from the power supply circuit to the appurtenance device, detecting a power supply glitch in the appurtenance device based on a result of the measuring the current, and suspending transmission of encrypted data from the appurtenance device to the information processing device if a power supply glitch in the appurtenance device is detected in the detecting.

A method for controlling an information processing device, the information processing device including circuitry configured to perform first encryption-decryption unit and a power supply circuit, and being configured to receive an appurtenance device configured to perform second encryption-decryption, includes supplying power from the power supply circuit to the circuitry and the appurtenance device, measuring a current from the power supply circuit to the circuitry and the appurtenance device, detecting a power supply glitch in the information processing device and the appurtenance device based on a result of the measuring the current, and suspending transmission of encrypted data from the information processing device to the appurtenance device if a power supply glitch in the information processing device is detected in the detecting, and suspending transmission of encrypted data from the appurtenance device to the information processing device if a power supply glitch in the appurtenance device is detected in the detecting.

DETAILED DESCRIPTION

Figure 1:
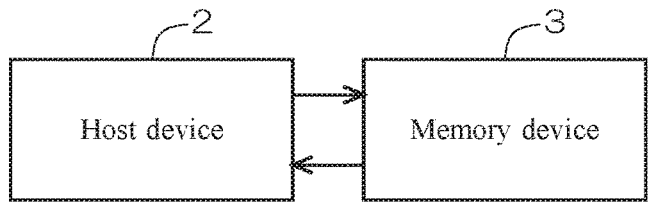
FIG. 1 is a diagram illustrating a configuration of a memory system.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically illustrated in order to simplify the drawing. The term "circuitry" herein may partly or entirely be implemented by using either hardware or software, or both hardware and software.

Taking countermeasures such as the above random delays and duplication in a cryptosystem may cause increased processing latency in the cryptosystem and decreased performance in the system, as these countermeasure operations are always performed at execution of applications, regardless of whether the system is actually under a fault attack.

The present disclosure is directed to an information processing system, an information processing device, and a method for controlling an information processing device that readily achieve an effective countermeasure against fault attacks.

An information processing system according to an aspect of the present disclosure includes an information processing device including a processing circuit including a first encryption-decryption unit, and an appurtenance device configured to be connected to the information processing device and including a second encryption-decryption unit. The information processing device further includes a first power supply unit configured to supply power to the processing circuit, a first current measurement unit configured to measure a current from the first power supply unit to the processing circuit, a detection unit configured to detect a power supply glitch in the information processing device based on a result of current measurement by the first current measurement unit, and a controller configured to suspend transmission of encrypted data from the information processing device to the appurtenance device, if the detection unit detects a power supply glitch in the information processing device. The first encryption-decryption unit, the second encryption-decryption unit, the first power supply unit, the first current measurement unit, and the detection unit may comprise suitable logic, circuitry, interfaces, and/or code.

In the information processing system according to this aspect, first current measurement unit measures a current from the first power supply unit to the processing circuit, and the detection unit detects a power supply glitch in the information processing device based on a result of current measurement by the first current measurement unit. This enables simplified and reliable detection of a power supply glitch in the information processing device. The controller performs countermeasure processing against a fault attack, if the detection unit detects a power supply glitch in the information processing device. Since the countermeasure processing against a fault attack is not performed if the detection unit detects no power supply glitch in the information processing device, increase in processing latency and degradation in system performance of the information processing system that would be otherwise caused by always running the countermeasure processing are effectively avoided. The controller suspends transmission of encrypted data from the information processing device to the appurtenance device if a power supply glitch in the information processing device is detected. This effectively prevents an attacker from retrieving false encrypted data for fault attack analysis.

In some embodiments, the controller is configured to continue to suspend transmission of encrypted data from the information processing device to the appurtenance device while the detection unit detects a power supply glitch in the information processing device.

According to such embodiments, the controller continues to suspend transmission of encrypted data from the information processing device to the appurtenance device while the detection unit detects a power supply glitch in the information processing device. This reliably prevents an attacker from retrieving false encrypted data for fault attack analysis, even when the power supply glitch is repeated for a fault attack.

In some embodiments, the information processing device further includes a first authentication unit configured to perform authentication to verify authenticity of the appurtenance device. The controller is configured to cause the first authentication unit to perform authentication after the detection unit detects a power supply glitch in the information processing device. The first authentication unit may comprise suitable logic, circuitry, interfaces, and/or code.

According to such embodiments, the controller causes the first authentication unit to perform authentication after the detection unit detects a power supply glitch in the information processing device. This effectively makes a fault attack by an attacker more difficult, since the attacker needs to break through authentication by the first authentication unit in order to restart transmission of encrypted data from the information processing device to the appurtenance device to retrieve false encrypted data.

In some embodiments, the information processing device further includes a second power supply unit configured to supply power to the appurtenance device, and a second current measurement unit configured to measure a current from the second power supply unit to the appurtenance device. The first authentication unit is configured to cause the appurtenance device to perform a predetermined power consumption operation for authentication of the appurtenance device in addition to a normal operation, and verify authenticity of the appurtenance device, based on a measured current values measured by the second current measurement unit in a period in which the appurtenance device performs the power consumption operation and a known reference current value that is a current value in the power consumption operation by the appurtenance device that is authorized. The second power supply unit and the second current measurement unit may comprise suitable logic, circuitry, interfaces, and/or code.

According to such embodiments, the first authentication unit causes the appurtenance device to perform a predetermined power consumption operation for authentication of the appurtenance device in addition to a normal operation, and verifies authenticity of the appurtenance device, based on a measured current values measured by the second current measurement unit in a period in which the appurtenance device performs the power consumption operation and a known reference current value that is a current value the power consumption operation by the appurtenance device that is authorized. When an unauthorized appurtenance device is not able to perform the power consumption operation, the measured current values do not match the reference current values, and thus authentication of the appurtenance device is readily performable by the first authentication unit. Even when an unauthorized appurtenance device is able to perform the power consumption operation, since an authorized and an unauthorized product have different power consumption characteristics due to differences in the device structure, the manufacturing process, and the like, the measured current values of the unauthorized product do not match the reference current values of the authorized product. Thus authentication of the appurtenance device is readily performable by the first authentication unit. Moreover, since the power consumption operation for authentication of the appurtenance device is not the normal operation of the appurtenance device but an independent operation added to the normal operation, the appurtenance device can be caused to perform any arbitrary power consumption operation having noticeable current consumption values or current consumption values that change noticeably. In consequence, accuracy in authentication of the appurtenance device by the first authentication unit is improved.

In some embodiments, the first authentication unit includes a pattern producing unit configured to chronologically arrange a plurality of measured current values measured by the second current measurement unit to produce a measured current value pattern, and a pattern comparing unit configured to compare the measured current value pattern produced by the pattern producing unit with a known reference current value pattern having chronologically arranged reference current values, and is configured to verify authenticity of the appurtenance device based on a comparison result by the pattern comparing unit. The pattern producing unit and the pattern comparing unit may comprise suitable logic, circuitry, interfaces, and/or code.

According to such embodiments, the pattern comparing unit compares the measured current value pattern produced by the pattern producing unit with a known reference current value pattern having chronologically arranged reference current values, and the first authentication unit verifies authenticity of the appurtenance device based on a comparison result by the pattern comparing unit. Since unauthorized products tend to be inferior, absolute values of current consumption of unauthorized products are often larger than those of authorized products. In the information processing system according to this aspect, the first authentication unit compares the measured current value pattern, rather than a pattern of rates of change in current consumption, with the reference current value pattern. This achieves highly accurate authentication of the appurtenance device, even when an authorized and unauthorized product have a similar pattern of rates of change in current consumption.

In some embodiments, the controller is configured to restart transmission of encrypted data from the information processing device to the appurtenance device, if the detection unit detects no power supply glitch in the information processing device after transmission of encrypted data from the information processing device to the appurtenance device is suspend, and authentication by the first authentication unit is successful.

According to such embodiments, the controller restarts transmission of encrypted data from the information processing device to the appurtenance device, if the detection unit detects no power supply glitch in the information processing device and authentication by the first authentication unit is successful. Thus the system availability is improved, since the normal operation of the information processing system is restarted when a fault attack ceases, subject to successful authentication by the first authentication unit. When a power supply glitch in the information processing device is detected due to abrupt noise such as static electricity, the normal operation of the information processing system is restarted subject to successful authentication by the first authentication unit, and thus system availability is improved.

In some embodiments, the detection unit is further configured to detect a power supply glitch in the appurtenance device based on a result of current measurement by the second current measurement unit, and the controller is further configured to suspend transmission of encrypted data from the appurtenance device to the information processing device, if the detection unit detects a power supply glitch in the appurtenance device.

According to such embodiments, the second current measurement unit measures a current from the second power supply unit to the appurtenance device, and the detection unit detects a power supply glitch in the appurtenance device based on a result of current measurement by the second current measurement unit. This enables simplified and reliable detection of a power supply glitch in the appurtenance device. The controller performs countermeasure processing against a fault attack, if the detection unit detects a power supply glitch in the appurtenance device. Since the countermeasure processing against a fault attack is not performed if the detection unit detects no power supply glitch in the appurtenance device, increase in processing latency and degradation in system performance of the information processing system that would be otherwise caused by always running the countermeasure processing are effectively avoided. If a power supply glitch in the appurtenance device is detected, the controller suspends transmission of encrypted data from the appurtenance device to the information processing device. This effectively prevents an attacker from retrieving false encrypted data for fault attack analysis.

In some embodiments, the controller is further configured to continue to suspend transmission of encrypted data from the appurtenance device to the information processing device while the detection unit detects a power supply glitch in the appurtenance device.

According to such embodiments, the controller continues to suspend transmission of encrypted data from the appurtenance device to the information processing device while the detection unit detects a power supply glitch in the appurtenance device. This reliably prevents an attacker from retrieving false encrypted data for fault attack analysis, even when the power supply glitch is repeated for a fault attack.

In some embodiments, the appurtenance device further includes a second authentication unit configured to perform authentication to verify authenticity of the information processing device, and the controller is configured to cause the second authentication unit to perform authentication after the detection unit detects a power supply glitch in the appurtenance device. The second authentication unit may comprise suitable logic, circuitry, interfaces, and/or code.

According to such embodiments, the controller causes the second authentication unit to perform authentication after the detection unit detects a power supply glitch in the appurtenance device. This effectively makes a fault attack by an attacker more difficult, since the attacker needs to break through authentication by the second authentication unit in order to restart transmission of encrypted data from the appurtenance device to the information processing device to retrieve false encrypted data.

In some embodiments, the controller is configured to restart transmission of encrypted data from the appurtenance device to the information processing device, if the detection unit detects no power supply glitch in the appurtenance device after transmission of encrypted data from the appurtenance device to the information processing device is suspended and authentication by the second authentication unit is successful.

According to such embodiments, the controller restarts transmission of encrypted data from the appurtenance device to the information processing device, if the detection unit detects no power supply glitch in the appurtenance device and authentication by the second authentication unit is successful. Thus the system availability is improved, since the normal operation of the information processing system is restarted when a fault attack ceases, subject to successful authentication by the second authentication unit. When a power supply glitch in the appurtenance device is detected due to abrupt noise such as static electricity, the normal operation of the information processing system is restarted subject to successful authentication by the second authentication unit, and thus system availability is improved.

An information processing system according to another aspect of the present disclosure includes an information processing device including a first encryption-decryption unit, and an appurtenance device configured to be connected to the information processing device and including a second encryption-decryption unit. The information processing device further includes a power supply unit configured to supply power to the appurtenance device, a current measurement unit configured to measure a current from the power supply unit to the appurtenance device, a detection unit configured to detect a power supply glitch in the appurtenance device based on a result of current measurement by the current measurement unit, and a controller configured to suspend transmission of encrypted data from the appurtenance device to the information processing device if the detection unit detects a power supply glitch in the appurtenance device. The first encryption-decryption unit, the second encryption-decryption unit, the power supply unit, the current measurement unit, and the detection unit may comprise suitable logic, circuitry, interfaces, and/or code.

In the information processing system according to this aspect, the current measurement unit measures a current from the power supply unit to the appurtenance device. The detection unit detects a power supply glitch in the appurtenance device based on a result of current measurement by the current measurement unit. This enables simplified and reliable detection of a power supply glitch in the appurtenance device. The controller performs countermeasure processing against a fault attack, if the detection unit detects a power supply glitch in the appurtenance device. Since the countermeasure processing against a fault attack is not performed if the detection unit detects no power supply glitch in appurtenance device, increase in processing latency and degradation in system performance of the information processing system that would be otherwise caused by always running the countermeasure processing are effectively avoided. If a power supply glitch in the appurtenance device is detected, the controller suspends transmission of encrypted data from the appurtenance device to the information processing device. This effectively prevents an attacker from retrieving false encrypted data for fault attack analysis.

In some embodiments, the controller is configured to continue to suspend transmission of encrypted data from the appurtenance device to the information processing device while the detection unit detects a power supply glitch in the appurtenance device.

According to such embodiments, the controller continues to suspend transmission of encrypted data from the appurtenance device to the information processing device while the detection unit detects a power supply glitch in the appurtenance device. This reliably prevents an attacker from retrieving false encrypted data for fault attack analysis, even when the power supply glitch is repeated for a fault attack.

In some embodiments, the appurtenance device farther includes an authentication unit configured to perform authentication to verify authenticity of the information processing device. The controller is configured to cause the authentication unit to perform authentication after the detection unit detects a power supply glitch in the appurtenance device. The authentication unit may comprise suitable logic, circuitry, interfaces, and/or code.

According to such embodiments, the controller causes the authentication unit to perform authentication after the detection unit detects a power supply glitch in the appurtenance device. This effectively makes a fault attack by an attacker more difficult, since the attacker needs to break through authentication by the authentication unit in order to restart transmission of encrypted data from the appurtenance device to the information processing device to retrieve false encrypted data.

In some embodiments, the controller is configured to restart transmission of encrypted data from the appurtenance device to the information processing device, if the detection unit detects no power supply glitch in the appurtenance device after transmission of encrypted data from the appurtenance device to the information processing device is suspended, and authentication by the authentication unit is successful.

According to such embodiments, the controller restarts transmission of encrypted data from the appurtenance device to the information processing device, if the detection unit detects no power supply glitch in the appurtenance device, and authentication by the authentication unit is successful. Thus the system availability is improved, since the normal operation of the information processing system is restarted when a fault attack ceases, subject to successful authentication by the authentication unit. When a power supply glitch in the appurtenance device is detected due to abrupt noise such as static electricity, the normal operation of the information processing system is restarted subject to successful authentication by the authentication unit, and thus system availability is improved.

An information processing system according to another aspect of the present disclosure includes an information processing device including a processing circuit including a first encryption-decryption unit, and an appurtenance device configured to be connected to the information processing device and including a second encryption-decryption unit. The information processing device further includes a power supply unit configured to supply power to the processing circuit and the appurtenance device, a current measurement unit configured to measure a current from the power supply unit to the processing circuit and the appurtenance device, a detection unit configured to detect a power supply glitch in the information processing device and the appurtenance device based on a result of current measurement by the current measurement unit, and a controller configured to suspend transmission of encrypted data from the information processing device to the appurtenance device if the detection unit detects a power supply glitch in the information processing device, and suspend transmission of encrypted data from the appurtenance device to the information processing device if the detection unit detects a power supply glitch in the appurtenance device. The first encryption-decryption unit, the second encryption-decryption unit, the power supply unit, the current measurement unit, and the detection unit may comprise suitable logic, circuitry, interfaces, and/or code.

In the information processing system according to this aspect, the current measurement unit measures a current from the power supply unit to the processing circuit and the appurtenance device, and the detection unit detects a power supply glitch in the information processing device and the appurtenance device based on a result of current measurement by the current measurement unit. This enables simplified and reliable detection of a power supply glitch in the information processing device and the appurtenance device. The controller performs countermeasure processing against a fault attack, if the detection unit detects a power supply glitch in the information processing device or the appurtenance device. Since the countermeasure processing against a fault attack is not performed if the detection unit detects no power supply glitch in the information processing device and the appurtenance device, increase in processing latency and degradation in system performance of the information processing system that would be otherwise caused by always running the countermeasure processing are effectively avoided. The controller suspends transmission of encrypted data from the information processing device to the appurtenance device if a power supply glitch in the information processing device is detected, and suspends transmission of encrypted data from the appurtenance device to the information processing device if a power supply glitch in the appurtenance device is detected. This effectively prevents an attacker from retrieving false encrypted data for fault attack analysis.

In some embodiments, the controller is configured to continue to suspend transmission of encrypted data from the information processing device to the appurtenance device while the detection unit detects a power supply glitch in the information processing device, and continue to suspend transmission of encrypted data from the appurtenance device to the information processing device while the detection unit detects a power supply glitch in the appurtenance device.

According to such embodiments, the controller continues to suspend transmission of encrypted data from the information processing device to the appurtenance device while the detection unit detects a power supply glitch in the information processing device, and continues to suspend transmission of encrypted data from the appurtenance device to the information processing device while the detection unit detects a power supply glitch in the appurtenance device. This reliably prevents an attacker from retrieving false encrypted data for fault attack analysis, even when the power supply glitch is repeated for a fault attack.

In some embodiments, the information processing device further includes a first authentication unit configured to perform authentication to verify authenticity of the appurtenance device. The appurtenance device further includes a second authentication unit configured to perform authentication to verify authenticity of the information processing device. The controller causes the first authentication unit to perform authentication after the detection unit detects a power supply glitch in the information processing device, and causes the second authentication unit to perform authentication after the detection unit detects a power supply glitch in the appurtenance device. The first authentication unit and the second authentication unit may comprise suitable logic, circuitry, interfaces, and/or code.

According to such embodiments, the controller causes the first authentication unit to perform authentication after the detection unit detects a power supply glitch in the information processing device. This effectively makes a fault attack by an attacker more difficult, since the attacker needs to break through authentication by the first authentication unit in order to restart transmission of encrypted data from the information processing device to the appurtenance device to retrieve false encrypted data. The controller causes the second authentication unit to perform authentication after the detection unit detects a power supply glitch in the appurtenance device. This effectively makes a fault attack by an attacker more difficult, since the attacker needs to break through authentication by the second authentication unit in order to restart transmission of encrypted data from the appurtenance device to the information processing device to retrieve false encrypted data.

In some embodiments, the controller is configured to restart transmission of encrypted data from the information processing device to the appurtenance device, if the detection unit detects no power supply glitch in the information processing device after transmission of encrypted data from the information processing device to the appurtenance device is suspended, and authentication by the first authentication unit is successful, and restart transmission of encrypted data from the appurtenance device to the information processing device, if the detection unit detects no power supply glitch in the appurtenance device after transmission of encrypted data from the appurtenance device to the information processing device is suspended, and authentication by the second authentication unit is successful.

According to such embodiments, the controller restarts transmission of encrypted data from the information processing device to the appurtenance device, if the detection unit detects no power supply glitch in the information processing device and authentication by the first authentication unit is successful. Thus the system availability is improved, since the normal operation of the information processing system is restarted when a fault attack ceases, subject to successful authentication by the first authentication unit. When a power supply glitch in the information processing device is detected due to abrupt noise such as static electricity, the normal operation of the information processing system is restarted subject to successful authentication by the first authentication unit, and thus system availability is improved. The controller restarts transmission of encrypted data from the appurtenance device to the information processing device, if detection unit detects no power supply glitch in the appurtenance device, and authentication by the second authentication unit is successful. Thus the system availability is improved, since the normal operation of the information processing system is restarted when a fault attack ceases, subject to successful authentication by the second authentication unit. When a power supply glitch in the appurtenance device is detected due to abrupt noise such as static electricity, the normal operation of the information processing system is restarted subject to successful authentication by the second authentication unit, and thus system availability is improved.

In some embodiments, the first encryption-decryption unit and the controller are provided on a single die.

According to such embodiments, the first encryption-decryption unit and the controller are provided on the same die. This configuration has an advantage of reduced number of components and manufacturing costs over the comparison where the first encryption-decryption unit and the controller are provided on separate dice. Moreover, this configuration contributes to a simplified system, with no need for secure communication between the first encryption-decryption unit and the controller.

In some embodiments, the first encryption-decryption unit and the controller are provided on separate dice.

According to such embodiments, the first encryption-decryption unit and the controller are provided on separate dice. This effectively makes an analysis by an attacker even more difficult, since the attacker needs to analyze the controller, as well as the first encryption-decryption unit.

An information processing device according to another aspect of the present disclosure includes a processing circuit including a first encryption-decryption unit. The information processing device is configured to receive an appurtenance device including a second encryption-decryption unit. The information processing device further includes a power supply unit configured to supply power to the processing circuit, a current measurement unit configured to measure a current from the power supply unit to the processing circuit, a detection unit configured to detect a power supply glitch in the information processing device based on a result of current measurement the current measurement unit, and a controller configured to suspend transmission of encrypted data from the information processing device to the appurtenance device if the detection unit detects a power supply glitch in the information processing device. The first encryption-decryption unit, the second encryption-decryption unit, the power supply unit, the current measurement unit, and the detection unit may comprise suitable logic, circuitry, interfaces, and/or code.

In the information processing device according to this aspect, the current measurement unit measures a current from the power supply unit to the processing circuit, and the detection unit detects a power supply glitch in the information processing device based on a result of current measurement by the current measurement unit. This enables simplified and reliable detection of a power supply glitch in the information processing device. The controller performs countermeasure processing against a fault attack, if the detection unit detects a power supply glitch in the information processing device. Since the countermeasure processing against a fault attack is not performed if the detection unit detects no power supply glitch in the information processing device, increase in processing latency and degradation in system performance of the information processing system that would be otherwise caused by always running the countermeasure processing are effectively avoided. The controller suspends transmission of encrypted data from the information processing device to the appurtenance device if a power supply glitch in the information processing device is detected. This effectively prevents an attacker from retrieving false encrypted data for fault attack analysis.

An information processing device according to another aspect of the present disclosure includes a first encryption-decryption unit. The information processing device is configured to receive an appurtenance device including a second encryption-decryption unit. The information processing device further includes a power supply unit configured to supply power to the appurtenance device, a current measurement unit configured to measure a current from the power supply unit to the appurtenance device, a detection unit configured to detect a power supply glitch in the appurtenance device based on a result of current measurement by the current measurement unit, and a controller configured to suspend transmission of encrypted data from the appurtenance device to the information processing device, if the detection unit detects a power supply glitch in the appurtenance device. The first encryption-decryption unit, the second encryption-decryption unit, the power supply unit, the current measurement unit, and the detection unit may comprise suitable logic, circuitry, interfaces, and/or code.

In the information processing device according to this aspect, the current measurement unit measures a current from the power supply unit to the appurtenance device, and the detection unit detects a power supply glitch in the appurtenance device based on a result of current measurement by the current measurement unit. This enables simplified and reliable detection of a power supply glitch in the appurtenance device. The controller performs countermeasure processing against a fault attack, if the detection unit detects a power supply glitch in the appurtenance device. Since the countermeasure processing against a fault attack is not performed if the detection unit detects no power supply glitch in the appurtenance device, increase in processing latency and degradation in system performance of the information processing system that would be otherwise caused by always running the countermeasure processing are effectively avoided. If a power supply glitch in the appurtenance device is detected, the controller suspends transmission of encrypted data from the appurtenance device to the information processing device. This effectively prevents an attacker from retrieving false encrypted data for fault attack analysis.

An information processing device according to another aspect of the present disclosure includes a processing circuit including a first encryption-decryption unit. The information processing device is configured to receive an appurtenance device including a second encryption-decryption unit. The information processing device further includes a power supply unit configured to supply power to the processing circuit and the appurtenance device, a current measurement unit configured to measure a current from the power supply unit to the processing circuit and the appurtenance device, a detection unit configured to detect a power supply glitch in the information processing device and the appurtenance device based on a result of current measurement by the current measurement unit, and a controller configured to suspend transmission of encrypted data from the information processing device to the appurtenance device if the detection unit detects a power supply glitch in the information processing device, and suspend transmission of encrypted data from the appurtenance device to the information processing device if the detection unit detects a power supply glitch in the appurtenance device. The first encryption-decryption unit, the second encryption-decryption unit, the power supply unit, the current measurement unit, and the detection unit may comprise suitable logic, circuitry, interfaces, and/or code.

In the information processing device according to this aspect, the current measurement unit measures a current from the power supply unit to the processing circuit and the appurtenance device, and the detection unit detects a power supply glitch in the information processing device and the appurtenance device based on a result of current measurement by the current measurement unit. This enables simplified and reliable detection of a power supply glitch in the information processing device and the appurtenance device. The controller performs countermeasure processing against a fault attack, if the detection unit detects a power supply glitch in the information processing device or the appurtenance device. Since the countermeasure processing against a fault attack is not performed if the detection unit detects no power supply glitch in the information processing device and the appurtenance device, increase in processing latency and degradation in system performance of the information processing system that would be otherwise caused by always running the countermeasure processing are effectively avoided. The controller suspends transmission of encrypted data from the information processing device to the appurtenance device if a power supply glitch in the information processing device is detected, and suspends transmission of encrypted data from the appurtenance device to the information processing device if a power supply glitch in the appurtenance device is detected. This effectively prevents an attacker from retrieving false encrypted data for fault attack analysis.

A method for controlling an information processing device according to another aspect of the present disclosure, the information processing device including a processing circuit including a first encryption-decryption unit and a power supply unit, and being configured to receive an appurtenance device including a second encryption-decryption unit, includes supplying power from the power supply unit to the processing circuit, measuring a current from the power supply unit to the processing circuit, detecting a power supply glitch in the information processing device based on a result of the measuring the current, and suspending transmission of encrypted data from the information processing device to the appurtenance device if a power supply glitch in the information processing device is detected in the detecting.

In the method for controlling an information processing device according to this aspect, a current from the power supply unit to the processing circuit is measured, and a power supply glitch in the information processing device is detected based on a result of current measurement. This enables simplified and reliable detection of a power supply glitch in the information processing device. When a power supply glitch in the information processing device is detected, countermeasure processing against a fault attack is performed. Since the countermeasure processing against a fault attack is not performed when no power supply glitch in the information processing device is detected, increase in processing latency and degradation in system performance of the information processing system that would be otherwise caused by always running the countermeasure processing are effectively avoided. When a power supply glitch in the information processing device is detected, transmission of encrypted data from the information processing device to the appurtenance device is suspend. This effectively prevents an attacker from retrieving false encrypted data for fault attack analysis.

A method for controlling an information processing device according to another aspect of the present disclosure, the information processing device including a processing circuit including a first encryption-decryption unit and a power supply unit, and being configured to receive an appurtenance device including a second encryption-decryption unit, includes supplying power from the power supply unit to the appurtenance device, measuring a current from the power supply unit to the appurtenance device, detecting a power supply glitch in the appurtenance device based on a result of the measuring the current, and suspending transmission of encrypted data from the appurtenance device to the information processing device if a power supply glitch in the appurtenance device is detected in the detecting.

In the method for controlling an information processing device according to this aspect, a current from the power supply unit to the appurtenance device is measured, and a power supply glitch in the appurtenance device is detected based on a result of current measurement. This enables simplified and reliable detection of a power supply glitch in the appurtenance device. When a power supply glitch in the appurtenance device is detected, countermeasure processing against a fault attack is performed. Since the countermeasure processing against a fault attack is not performed when no power supply glitch in the appurtenance device is detected, increase in processing latency and degradation in system performance of the information processing system that would be otherwise caused by always running the countermeasure processing are effectively avoided. When a power supply glitch in the appurtenance device is detected, transmission of encrypted data from the appurtenance device to the information processing device is suspended. This effectively prevents an attacker from retrieving false encrypted data for fault attack analysis.

A method for controlling an information processing device according to another aspect of the present disclosure, the information processing device including a processing circuit including a first encryption-decryption unit and a power supply unit, and being configured to receive an appurtenance device including a second encryption-decryption unit, includes supplying power from the power supply unit to the processing circuit and the appurtenance device, measuring a current from the power supply unit to the processing circuit and the appurtenance device, detecting a power supply glitch in the information processing device and the appurtenance device based on a result of the measuring the current, and suspending transmission of encrypted data from the information processing device to the appurtenance device if a power supply glitch in the information processing device is detected in the detecting, and suspending transmission of encrypted data from the appurtenance device to the information processing device if a power supply glitch in the appurtenance device is detected in the detecting.

In the method for controlling an information processing device according to this aspect, a current from the power supply unit to the processing circuit and the appurtenance device is measured, and a power supply glitch in the information processing device and the appurtenance device is detected based on a result of current measurement. This enables simplified and reliable detection of a power supply glitch in the information processing device and the appurtenance device. When a power supply glitch in the information processing device or the appurtenance device is detected, countermeasure processing against a fault attack is performed. Since the countermeasure processing against a fault attack is not performed when no power supply glitch in the information processing device and the appurtenance device is detected, increase in processing latency and degradation in system performance of the information processing system that would be otherwise caused by always running the countermeasure processing are effectively avoided. When a power supply glitch in the information processing device is detected, transmission of encrypted data from the information processing device to the appurtenance device is suspended, and when a power supply glitch in the appurtenance device is detected, transmission of encrypted data from the appurtenance device to the information processing device is suspended. This effectively prevents an attacker from retrieving false encrypted data for fault attack analysis.

Embodiments of the present disclosure readily achieve an effective countermeasure against fault attacks.

These and other objects, features, aspects and advantages of the present disclosure will become more apparent from the following description of embodiments when taken in conjunction with the accompanying drawings.

DESCRIPTION OF EMBODIMENTS

Embodiments of the present disclosure are described in detail below referring to the drawings. It should be noted that identical reference numerals throughout the drawings indicate identical or equivalent elements.

Embodiment 1

FIG. 1 is a diagram illustrating a configuration of a memory system 1 according to Embodiment 1 of the present disclosure. As illustrated in FIG. 1, the memory system 1 includes a host device 2 and a memory device 3 detachably connected to the host device 2. The host device 2 is an information processing device, such as a personal computer, while the memory device 3 is an appurtenance device, such as a flash memory card, operable with power supplied by the host device 2. In another example, the information processing device may be a printer or a multi-functional device, while the appurtenance device may be a toner cartridge. Alternatively, the information processing device may be a gaming console, while the appurtenance device may be a memory card in which a gaming program is stored.

Figure 2:
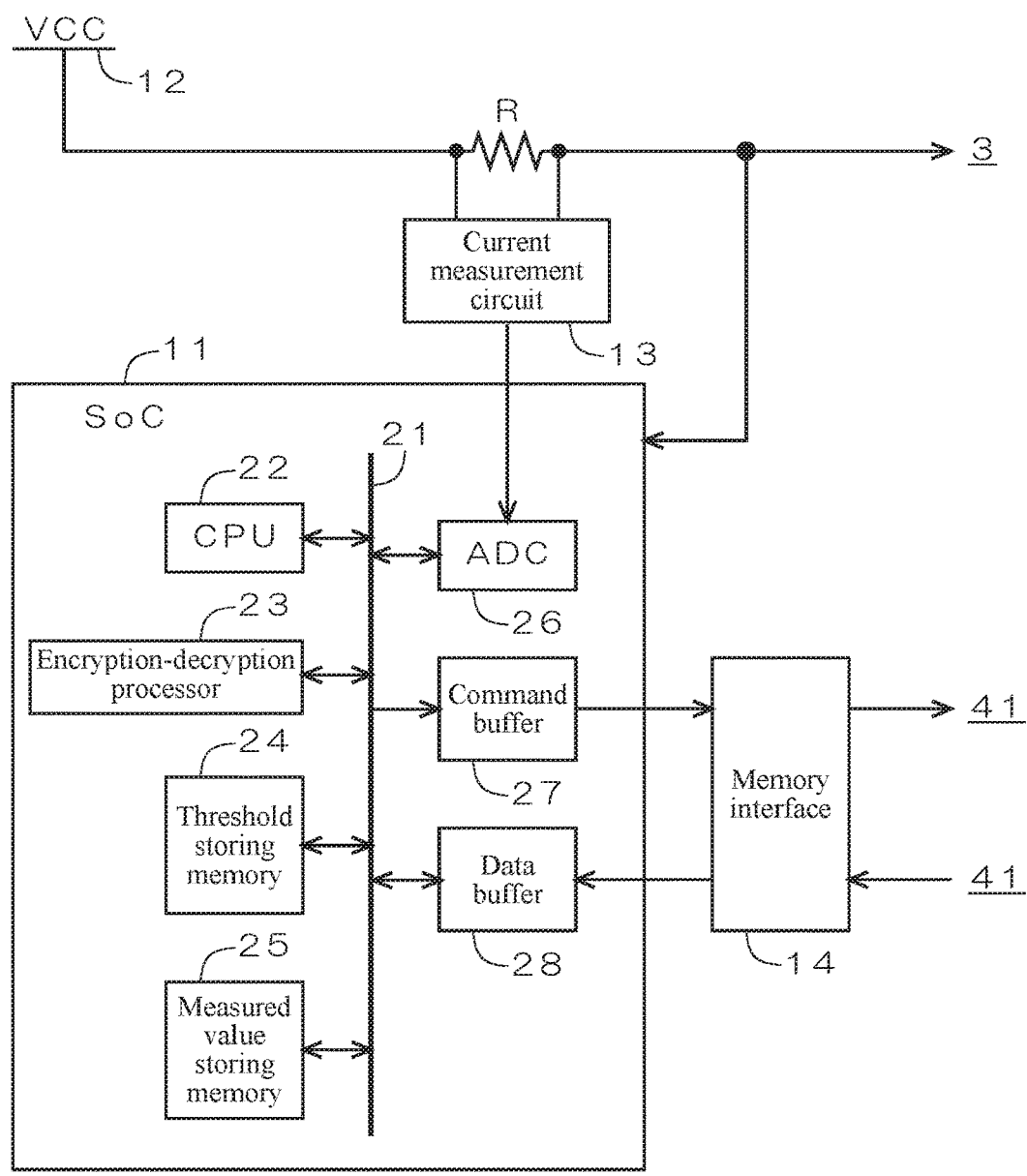
FIG. 2 is a simplified diagram illustrating a configuration of a host device.

FIG. 2 is a simplified diagram illustrating a configuration of the host device 2. As illustrated in FIG. 2, the host device 2 includes a System on a Chip (SoC) 11, a power supply unit 12, a current measurement circuit 13, and a memory interface 14. The SoC 11 includes a CPU 22, an encryption-decryption processor 23, a threshold storing memory 24, a measured value storing memory 25, an Analog to Digital Converter (ADC) 26, a command buffer 27, and a data buffer 28, connected to each other via a bus 21. The power supply unit 12 supplies the SoC 11 and the memory device 3 with supply voltage VCC to operate the SoC 11 and the memory device 3 via a resistance element R. The current measurement circuit 13 measures a voltage between both ends of the resistance element R to measure the value of a current passing from the power supply unit 12 to the SoC 11 and the memory device 3. Instead of providing the encryption-decryption processor 23 as hardware, the CPU 22 may perform encryption and decryption by software processing. The current measurement circuit 13 may be provided in the SoC 11.

Figure 3:
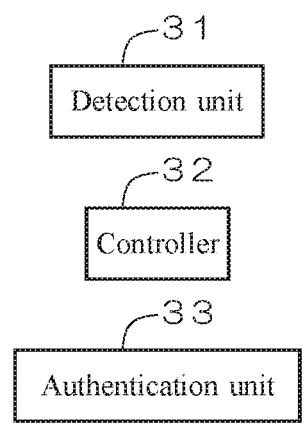
FIG. 3 is a diagram illustrating part of functions performed by a CPU.

FIG. 3 is a diagram illustrating part of functions performed by the CPU 22. As illustrated in FIG. 3, the CPU 22 serves as a detection unit 31, a controller 32, and an authentication unit 33. Alternatively, the detection unit 31, the controller 32, and the authentication unit 33 may be configured as dedicated hardware circuits separately from the CPU 22.

Figure 4:
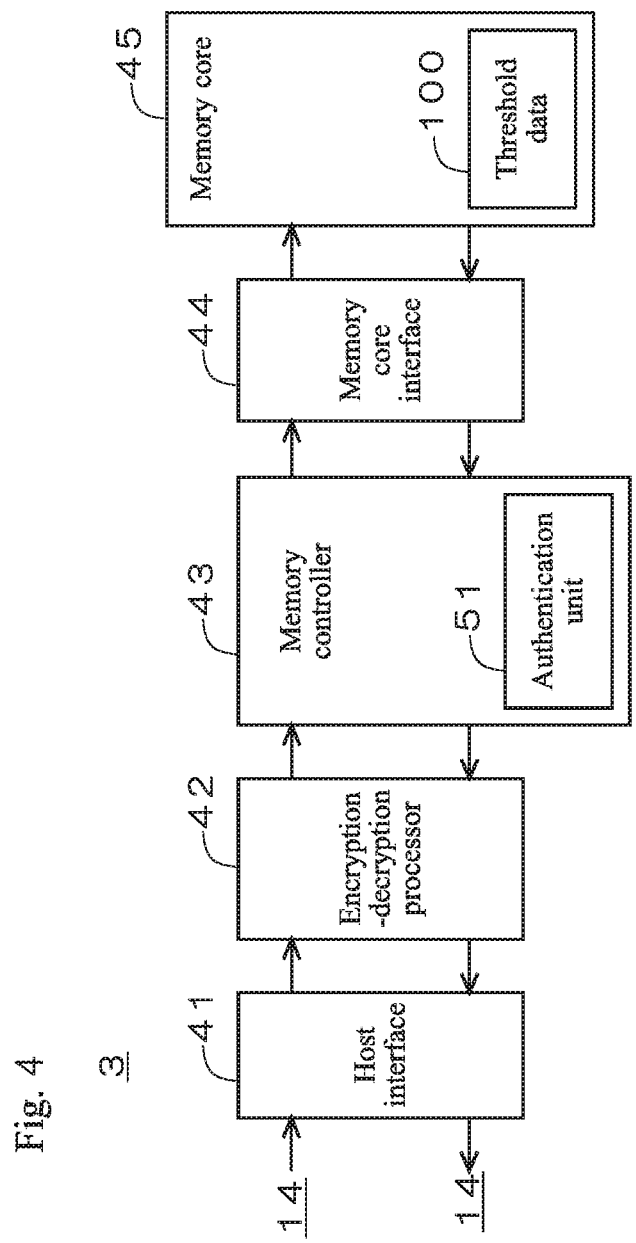
FIG. 4 is a simplified diagram illustrating a configuration of a memory device.

FIG. 4 is a simplified diagram illustrating a configuration of the memory device 3. As illustrated in FIG. 4, the memory device 3 includes a host interface 41, an encryption-decryption processor 42, a memory controller 43, a memory core interface 44, and a memory core 45. The memory controller 43 includes an authentication unit 51. The memory core 45 retains arbitrary content data such as images and sounds. The memory core 45 also retains below-described threshold data 100 at its specific address area.

Figure 5:
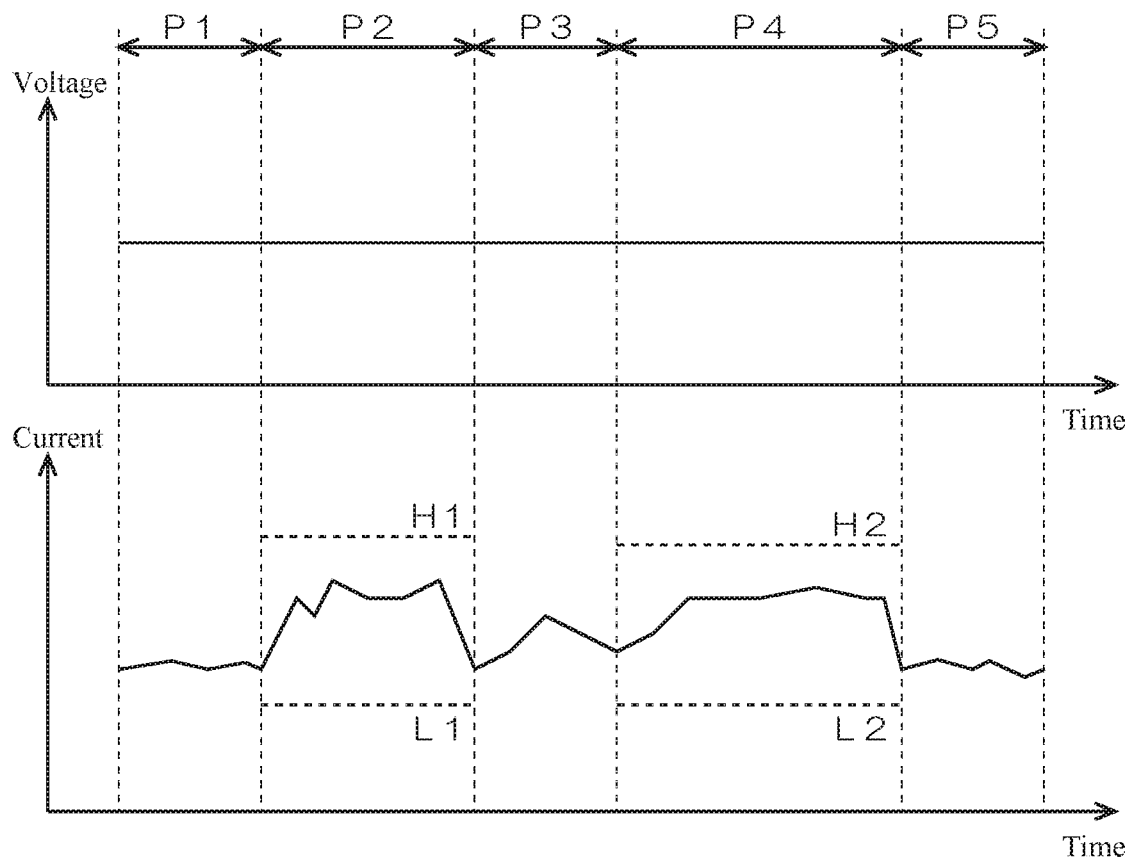
FIG. 5 is a diagram illustrating readout of content data from the memory device.

FIG. 5 is a diagram illustrating readout of content data from the memory device 3 included in the normal operation of the memory system 1. Firstly in a command preparation period P1, the CPU 22 generates and issues a read command to read desired content data from the memory device 3.

Next in a command transmission period P2, the encryption-decryption processor 23 encrypts the read command issued by the CPU 22 to generate an encrypted read command, and sets the command buffer 27 with this encrypted read command. The encrypted read command is sent from the command buffer 27 via the memory interface 14 to the memory device 3. The host interface 41 inputs the encrypted read command received from the host device 2 to the encryption-decryption processor 42. The encryption-decryption processor 42 decrypts the received encrypted read command to input the read command to the memory controller 43. The memory controller 43 decodes the received read command.

In a data read period P3, the memory controller 43 inputs a read address of content data to the memory core interface 44. The read address is input from the memory core interface 44 to the core 45, by which desired content data is read from the memory core 45. The read content data is input via the memory core interface 44 to the memory controller 43.

In a content data transmission period P4, the memory controller 43 inputs the content data to the encryption-decryption processor 42. The encryption-decryption processor 42 encrypts the received content data to generate encrypted content data, and inputs the encrypted content data to the host interface 41. The host interface 41 sends the received encrypted content data to the host device 2. The memory interface 14 inputs the encrypted content data received from the memory device 3 via the data buffer 28 to the encryption-decryption processor 23. The encryption-decryption processor 23 decrypts the received encrypted content data.

In a data processing period P5, the encryption-decryption processor 23 inputs the decrypted content data to the CPU 22, and the CPU 22 processes the received content data.

Here, targets of fault attacks are the encryption-decryption processor 23 of the host device 2 and the encryption-decryption processor 42 of the memory device 3. More specifically, fault attacks aim to generate a false encrypted command by applying a power supply glitch to the supply voltage VCC in the command transmission period P2 or generating false encrypted content data by applying a power supply glitch to the supply voltage VCC in the data transmission period P4, and retrieve and analyze thus generated false encrypted command or encrypted content data.

Authorized host devices 2 and memory devices 3, for which the types of semiconductor devices to be implemented and the manufacturing processes of each device are strictly controlled, would show almost consistent power consumption characteristics of the SoC 11 and the memory device 3 in the command transmission period P2 and almost consistent power consumption characteristics of the SoC 11 and the memory device 3 in the content data transmission period P4.

In the memory system 1 according to the present embodiment, as illustrated in FIG. 5, a threshold L1 is set to a value slightly smaller than a minimum of a current that passes from the power supply unit 12 to the SoC 11 and the memory device 3 in the command transmission period P2, and a threshold H1 is set to a value slightly larger than a maximum of a current that passes from the power supply unit 12 to the SoC 11 and the memory device 3 in the command transmission period P2. A threshold L2 is set to a value slightly smaller than a minimum of a current that passes from the power supply unit 12 to the SoC 11 and the memory device 3 in the content data transmission period P4, and a threshold H2 is set to a value slightly larger than a maximum of a current that passes from the power supply unit 12 to the SoC 11 and the memory device 3 in the content data transmission period P4. These thresholds L1, H1, L2, and H2 are set before factory shipment, and stored as encrypted threshold data 100 (see FIG. 4) in a specific address area of the memory core 45.

When the memory device 3 is connected to the host device 2 and power supply is started, the CPU 22 issues a read command to read the threshold data 100 from memory device 3 and sets the command buffer 27 with this read command. The read command is sent from the command buffer 27 via the memory interface 14 to the memory device 3. The host interface 41 inputs the read command received from the host device 2 to the memory controller 43. The memory controller 43 decodes the received read command to input a read address of the threshold data 100 to the memory core interface 44. The read address is input from the memory core interface 44 to the memory core 45, by which the threshold data 100 is read from the memory core 45. The read threshold data 100 is sent as encrypted via the memory core interface 44 and the host interface 41 to the host device 2. The memory interface 14 stores the threshold data 100 received from the memory device 3 in the data buffer 28. The CPU 22 transfers the threshold data 100 stored in the data buffer 28 to the encryption-decryption processor 23, and the encryption-decryption processor 23 decrypts the encrypted threshold data 100. The CPU 22 transfers the decrypted threshold data 100 to the threshold storing memory 24. By the above processes, the threshold data 100 read from the memory device 3 is stored in the threshold storing memory 24.

Referring to FIG. 3, the controller 32 drives the ADC 26 before readout of content data from the memory device 3 is started.

Measured current values measured by the current measurement circuit 13 in the command transmission period P2 are converted from analog to digital form by the ADC 26, and then stored in the measured value storing memory 25. The detection unit 31 sequentially compares the measured current values in the command transmission period P2 with the thresholds L1 and H1 stored in the threshold storing memory 24. Measured current values smaller than the threshold L1 or larger than the threshold H1 represent detection of a power supply glitch attack on the encryption-decryption processor 23 of the host device 2, while measured current values larger than or equal to the threshold L1 and smaller than or equal to the threshold H1 represent detection of no power supply glitch attack.

Similarly, measured current values measured by the current measurement circuit 13 in the content data transmission period P4 are converted from analog to digital form by the ADC 26, and then stored in the measured value storing memory 25. The detection unit 31 sequentially compares the measured current values in the content data transmission period P4 with the thresholds L2 and H2 stored in the threshold storing memory 24. Measured current values smaller than the threshold L2 or larger than the threshold H2 represent detection of a power supply glitch attack on the encryption-decryption processor 42 of the memory device 3, while measured current values larger than or equal to the threshold L2 and smaller than or equal to the threshold H2 represent detection of no power supply glitch attack.

Figure 6:
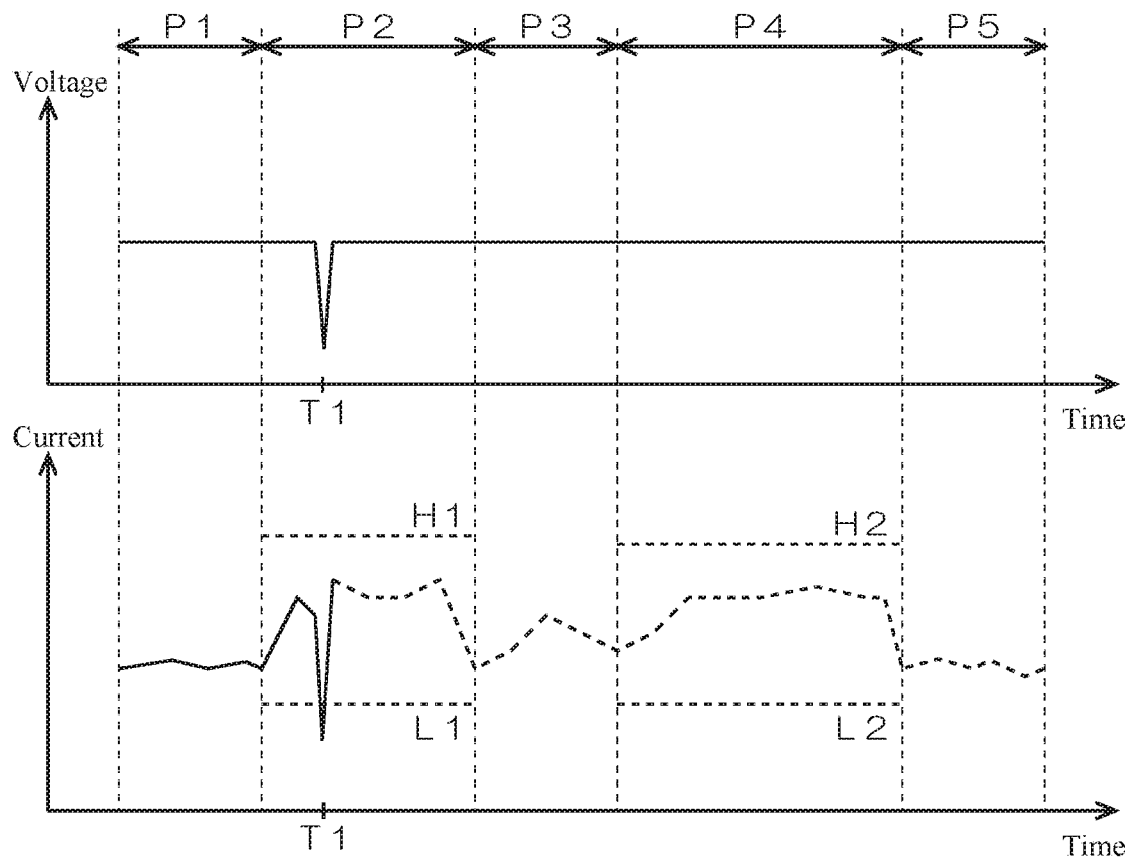
FIG. 6 is a diagram illustrating processing when a power supply glitch is detected in a command transmission period.

FIG. 6 is a diagram illustrating processing when a power supply glitch is detected in the command transmission period P2. A power supply glitch (in this example, Low glitch) is applied to the supply voltage VCC at a time T1 in the command transmission period P2, which results in the measured current value at the time T1 being smaller than the threshold L1. The detection unit 31 thereby detects the power supply glitch in the host device 2 at the time T1.

When the detection unit 31 detects the power supply glitch in the host device 2, the controller 32 suspends output of an encrypted command from at least one of the encryption-decryption processor 23, the command buffer 27, and the memory interface 14, so as to immediately suspend transmission of the encrypted command from the host device 2 to the memory device 3. Where output of the encrypted command from the encryption-decryption processor 23 is to be suspended, for example, encryption of a command per se by the encryption-decryption processor 23 can be suspended, by forcibly suspending input of an operation clock to the encryption-decryption processor 23 or forcibly suspending supply of driving power to the encryption-decryption processor 23. Then the controller 32 causes the authentication units 33 and 51 to perform mutual authentication between the host device 2 and the memory device 3. The authentication unit 33 of the host device 2 verifies authenticity of the memory device 3, while the authentication unit 51 of the memory device 3 verifies authenticity of the host device 2. Authentication can be performed by employing, for example, challenge-and-response authentication protocols using modern encryption such as AES.

If authentication of the memory device 3 by the authentication unit 33 results in failure (FAIL), the controller 32 continues to suspend transmission of the encrypted command from the host device 2 to the memory device 3. If authentication of the memory device 3 by the authentication unit 33 results in success (PASS), the controller 32 restarts the normal operation of the memory system 1, the CPU 22 reissuing the command the transmission of which has been suspended. While the normal operation is restarted, the detection unit 31 continues to sequentially compare measured current values in the command transmission period P2 with the thresholds L1 and H1 stored in the threshold storing memory 24. When the detection unit 31 detects a power supply glitch in the host device 2 again, the controller 32 immediately suspends transmission of an encrypted command from the host device 2 to the memory device 3, and then causes the authentication units 33 and 51 to perform mutual authentication in a similar way to the above. Suspension of transmission of the encrypted command from the host device 2 to the memory device 3 thus continues, as long as the fault attack on the host device 2 continues and the detection unit 31 continues to detect a power supply glitch in the host device 2. When the authentication unit 33 successfully authenticates the memory device 3, the normal operation of the memory system 1 is restarted, and thereafter if the detection unit 31 detects no power supply glitch in the host device 2, transmission of the encrypted command from the host device 2 to the memory device 3 is appropriately restarted.

Figure 7:
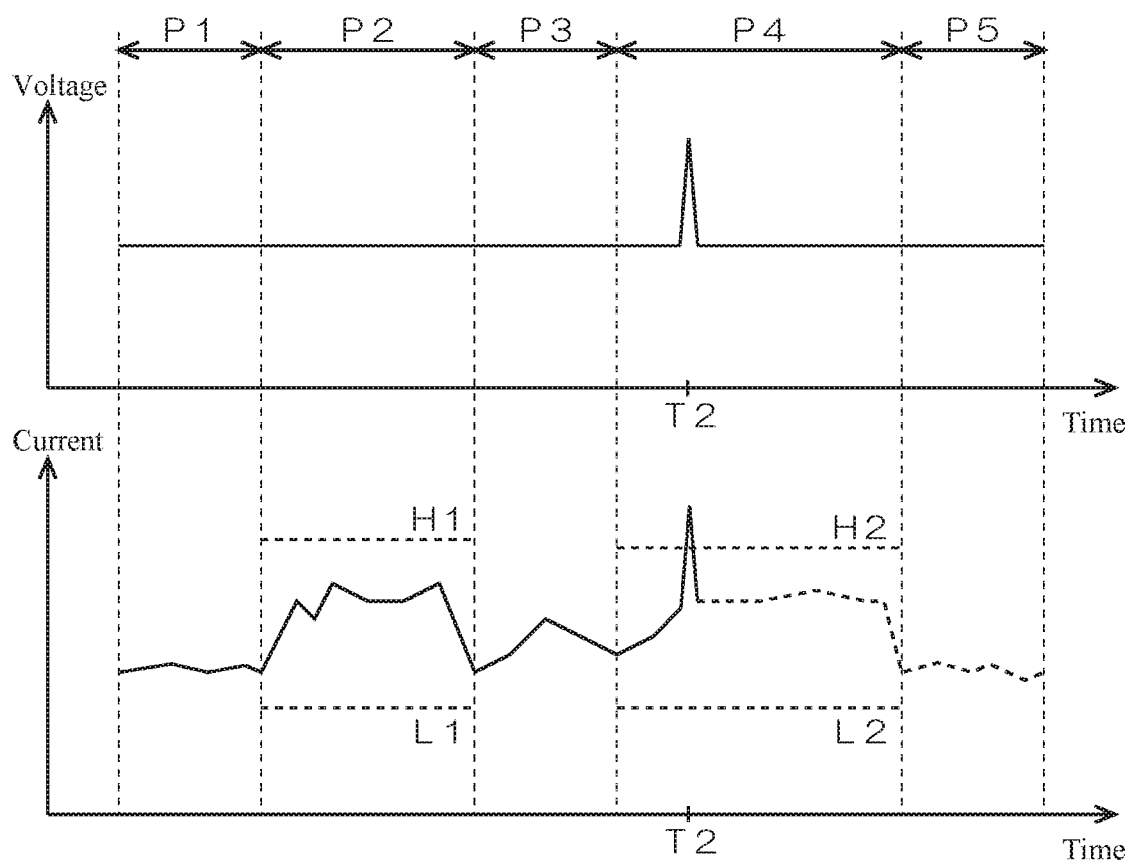
FIG. 7 is a diagram illustrating processing when a power supply glitch is detected in a content data transmission period.

FIG. 7 is a diagram illustrating processing when a power supply glitch is detected in the content data transmission period P4. A power supply glitch (in this example, High glitch) is applied to the supply voltage VCC at a time T2 in the content data transmission period P4, which results in the measured current value at the time T2 being larger than the threshold H2. The detection unit 31 thereby detects the power supply glitch in the memory device 3 at the time 12.

When the detection unit 31 detects the power supply glitch in the memory device 3, the controller 32 suspends output of encrypted content data from at least one of the encryption-decryption processor 42 and the host interface 41, so as to immediately suspend transmission of the encrypted content data from the memory device 3 to the host device 2. Where output of the encrypted content data from the encryption-decryption processor 42 is to be suspended, for example, encryption of content data per se by the encryption-decryption processor 42 can be suspended, by forcibly suspending input of an operation clock to the encryption-decryption processor 42 or forcibly suspending supply of driving power to the encryption-decryption processor 42. Then the controller 32 causes the authentication units 33 and 51 to perform mutual authentication between the host device 2 and the memory device 3.

If authentication of the host device 2 by the authentication unit 51 results in failure (FAIL), the controller 32 continues to suspend transmission of the encrypted content data from the memory device 3 to the host device 2. If authentication of the host device 2 by the authentication unit 51 results in success (PASS), the controller 32 restarts the normal operation of the memory system 1, the CPU 22 reissuing the command the transmission of which has been suspended. While the normal operation is restarted, the detection unit 31 continues to sequentially compare measured current values in the content data transmission period P4 with the thresholds L2 and H2 stored in the threshold storing memory 24. When the detection unit 31 detects a power supply glitch in the memory device 3 again, the controller 32 immediately suspends transmission of encrypted content data from the memory device 3 to the host device 2, and then causes the authentication units 33 and 51 to perform mutual authentication in a similar way to the above. Suspension of transmission of the encrypted content data from the memory device 3 to the host device 2 thus continues, as long as the fault attack on the device 3 continues and the detection unit 31 continues to detect a power supply glitch in the memory device 3. When the authentication unit 51 successfully authenticates the host device 2, the normal operation of the memory system 1 is restarted, and thereafter if the detection unit 31 detects no power supply glitch in the memory device 3, transmission of the encrypted content data from the memory device 3 to the host device 2 is appropriately restarted.

In the memory system 1 (information processing system) according to the present embodiment, the current measurement circuit 13 (current measurement unit) measures a current that passes from the power supply unit 12 to the SoC 11 (processing circuit) and the memory device 3 (appurtenance device), and the detection unit 31 detects a power supply glitch in the host device 2 (information processing device) and the memory device 3, on the basis of a result of current measurement by the current measurement circuit 13. This enables simplified and reliable detection of a power supply glitch in the host device 2 and the memory device 3. The controller 32 performs countermeasure processing against a fault attack if the detection unit 31 detects a power supply glitch in the host device 2 or the memory device 3. Since the countermeasure processing against a fault attack is not performed if the detection unit 31 detects no power supply glitch in the host device 2 and the memory device 3, increase in processing latency and degradation in system performance of the memory system 1 that would be otherwise caused by always running the countermeasure processing are effectively avoided. The controller 32 suspends transmission of an encrypted command (encrypted data) from the host device 2 to the memory device 3 if a power supply glitch in the host device 2 is detected, while it suspends transmission of encrypted content data (encrypted data) from the memory device 3 to the host device 2 if a power supply glitch in the memory device 3 is detected. This effectively prevents an attacker from retrieving a false encrypted command and false encrypted content data for fault attack analysis.

In the memory system 1 according to the present embodiment, the controller 32 continues to suspend transmission of an encrypted command from the host device 2 to the memory device 3 while the detection unit 31 detects a power supply glitch in the host device 2, and continues to suspend transmission encrypted content data from the memory device 3 to the host device 2 while the detection unit 31 detects a power supply glitch in the memory device 3. This reliably prevents an attacker from retrieving a false encrypted command and false encrypted content data for fault attack analysis, even when the power supply glitch is repeated for a fault attack.

In the memory system 1 according to the present embodiment, the controller 32 causes the authentication unit 33 (first authentication unit) to perform authentication after the detection unit 31 detects a power supply glitch in the host device 2. This effectively makes a fault attack by an attacker more difficult, since the attacker needs to break through authentication by the authentication unit 33 in order to restart transmission of an encrypted command from the host device 2 to the memory device 3 to retrieve a false encrypted command. The controller 32 also causes the authentication unit 51 (second authentication unit) to perform authentication after the detection unit 31 detects a power supply glitch in the memory device 3. This effectively makes a fault attack by an attacker more difficult, since the attacker needs to break through authentication by the authentication unit 51 in order to restart transmission of encrypted content data from the memory device 3 to the host device 2 to retrieve false encrypted content data.

In the memory system 1 according to the present embodiment, the controller 32 restarts transmission of an encrypted command from the host device 2 to the memory device 3, if the detection unit 31 detects no power supply glitch in the host device 2 and authentication by the authentication unit 33 is successful. Thus the system availability is improved, since the normal operation of the memory system 1 is restarted when a fault attack ceases, subject to successful authentication by the authentication unit 33. When a power supply glitch in the host device 2 due to abrupt noise such as static electricity is detected, the normal operation of the memory system 1 is restarted subject to successful authentication by the authentication unit 33, and thus the system availability is improved. The controller 32 restarts transmission of encrypted content data from the memory device 3 to the host device 2, if the detection unit 31 detects no power supply glitch in the memory device 3 and authentication by the authentication unit 51 is successful. Thus the system availability is improved, since the normal operation of the memory system 1 is restarted when a fault attack ceases, subject to successful authentication by the authentication unit 51. When a power supply glitch in the memory device 3 detected is due to abrupt noise such as static electricity, the normal operation of the memory system 1 is restarted, subject to successful authentication by the authentication unit 51, and thus the system availability is improved.

Figure 8:
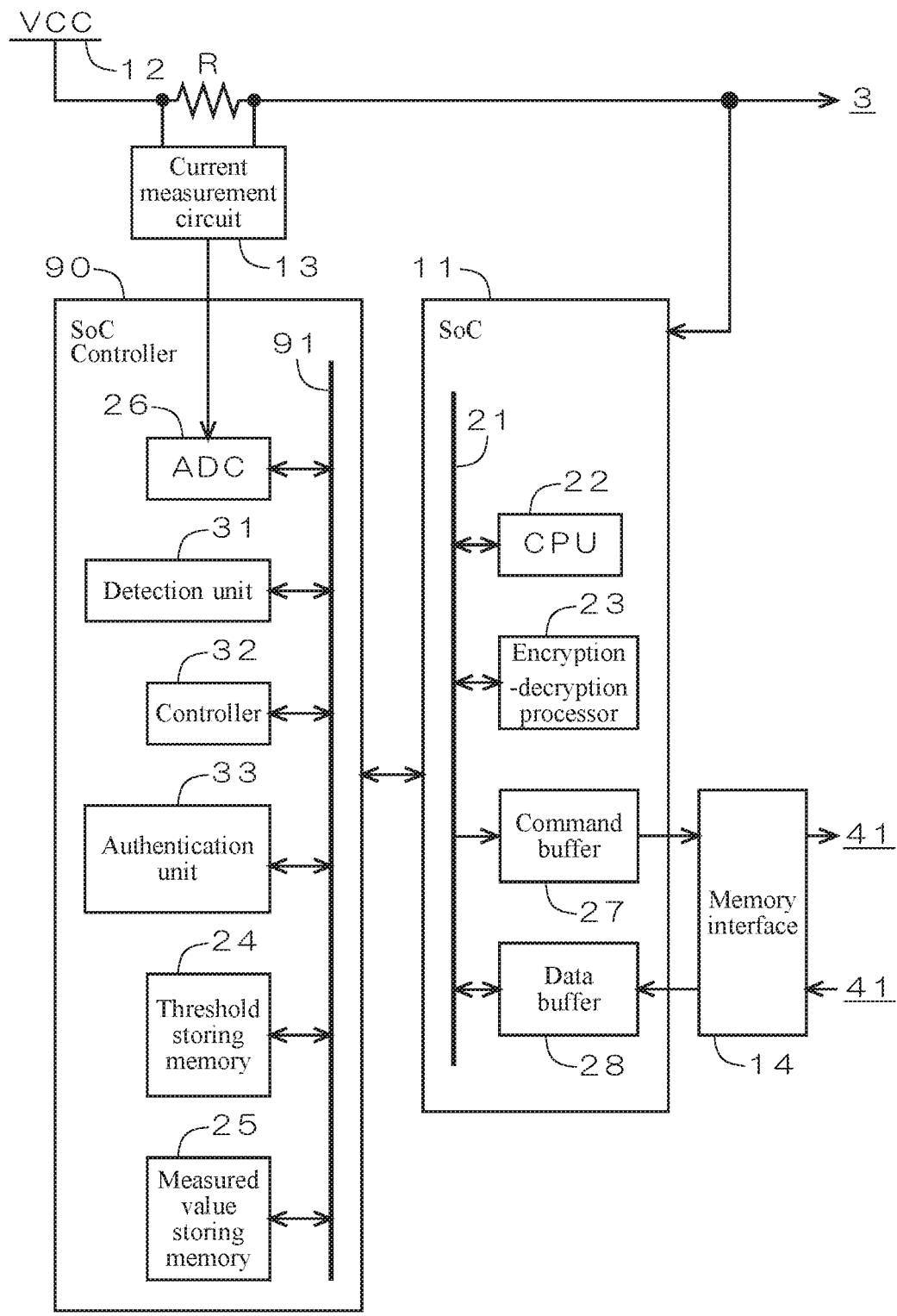
FIG. 8 is a simplified diagram illustrating a configuration of the host device according to a modification.

FIG. 8 is a simplified diagram illustrating a configuration of the host device 2 according to a modification of the present embodiment. As illustrated in FIG. 8, the host device 2 includes a SoC 11, a SoC controller 90, a power supply unit 12, a current measurement circuit 13, and a memory interface 14. The SoC controller 90 and the SoC 11 are provided on separate dice (IC chips). The SoC 11 includes a CPU 22, an encryption-decryption processor 23, a command buffer 27, and a data buffer connected to each other via a bus 21. The SoC controller 90 includes an ADC 26, a detection unit 31, a controller 32, an authentication unit 33, a threshold storing memory 24, and a measured value storing memory 25, connected to each other via a bus 91. The current measurement circuit 13 may be provided in the SoC controller 90.

When the detection unit 31 detects a power supply glitch in the host device 2, the controller 32 suspends output of an encrypted command from at least one of the encryption-decryption processor 23, the command buffer 27, and the memory interface 14, or suspends the whole operation of the SoC 11, so as to immediately suspend transmission of the encrypted command from the host device 2 to the memory device 3. The whole operation of the SoC 11 can be suspended, by, for example, forcibly suspending supply of driving power to the SoC 11.

According to the present modification, the SoC 11 and the SoC controller 90 are provided on separate dice. This effectively make an analysis by an attacker even more difficult, since the attacker needs to analyze the SoC controller 90, as well as the SoC 11.

In contrast, according to the configuration illustrated in FIG. 2, the CPU 22 (the detection unit 31, the controller 32, and the authentication unit 33) and the encryption-decryption processor 23 are provided on the same die (SoC 11). This configuration has an advantage of reduced number of components and manufacturing costs over the configuration where these are provided on separate dice (FIG. 8). Moreover, this configuration contributes to a simplified system, with no need for secure communication between the SoC 11 and the SoC controller 90.

Embodiment 2

Description of the memory system 1 according to Embodiment 2 of the present disclosure mainly focuses on differences from Embodiment 1.

Figure 9:
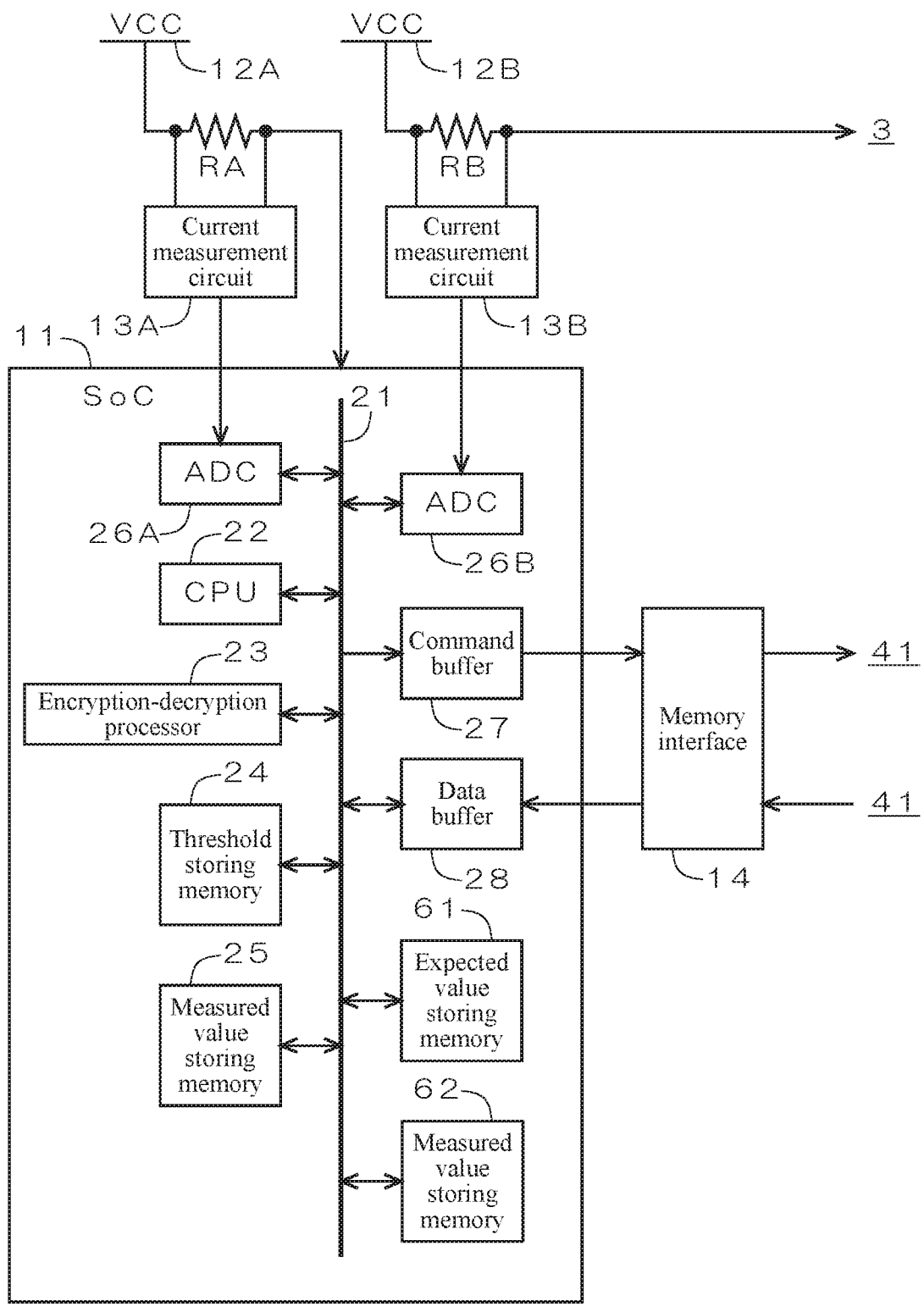
FIG. 9 is a simplified diagram illustrating a configuration of the host device.

FIG. 9 is a simplified diagram illustrating a configuration of the host device 2. As illustrated in FIG. 9, the host device 2 includes the SoC 11, power supply units 12A and 12B, current measurement circuits 13A and 13B, and the memory interface 14. The SoC 11 includes the CPU 22, the encryption-decryption processor 23, the threshold storing memory 24, the measured value storing memory 25, ADCs 26A and 26B, the command buffer 27, the data buffer 28, an expected value storing memory 61, and a measured value storing memory 62, connected to each other via the bus 21. The power supply unit 12A supplies the SoC 11 with supply voltage VCC to operate the SoC 11 via a resist, element RA. The current measurement circuit 13A measures a voltage between both ends of the resistance element RA to measure the value of a current passing from the power supply unit 12A to the SoC 11. The power supply unit 12B supplies the memory device 3 with supply voltage VCC to operate the memory device 3 via a resistance element RB. The current measurement circuit 13B measures a voltage between both ends of the resistance element RB to measure the value of a current passing from the power supply unit 12B to the memory device 3. The current measurement circuits 13A and 13B may be provided in the SoC 11.

In the memory system 1 according to the present embodiment, the threshold L1 is set to a value slightly smaller than a minimum of a current that passes from the power supply unit 12A to the SoC 11 in the command transmission period P2, and the threshold H1 is set to a value slightly larger than a maximum of a current that passes from the power supply unit 12A to the SoC 11 in the command transmission period P2. In the present embodiment, the power consumption of the memory device 3 can be excluded from consideration in setting the thresholds L1 and H1. Thus in comparison with Embodiment 1, the thresholds L1 and H1 can be closer to the minimum and the maximum, respectively, which in consequence improves accuracy in detection of a power supply glitch in the host device 2. The threshold L2 is set to a value slightly smaller than a minimum of a current that passes from the power supply unit 12B to the memory device 3 in the content data transmission period P4, and the threshold H2 is set to a value slightly larger than a maximum of a current that passes from the power supply unit 12B to the memory device 3 in the content data transmission period P4. In the present embodiment, the power consumption of the host device 2 can be excluded from consideration in setting the thresholds L2 and H2. Thus in comparison with Embodiment 1, the thresholds L2 and H2 can be closer to the minimum and the maximum, respectively, which in consequence improves accuracy in detection of a power supply glitch in the memory device 3.

Referring to FIG. 3, the controller 32 drives the ADCs 26A and 26B before readout of content data from the memory device 3 is started.

Measured current values measured by the current measurement circuit 13A in the command transmission period P2 are converted from analog to digital form by the ADC 26A, and then stored in the measured value storing memory 25. The detection unit 31 sequentially compares the measured current values in the command transmission period P2 with the thresholds L1 and H1 stored in the threshold storing memory 24. Measured current values smaller than the threshold L1 or larger than the threshold H1 represent detection of a power supply glitch attack on the encryption-decryption processor 23 of the host device 2, while measured current values larger than or equal to the threshold L1 and smaller than or equal to the threshold H1 represent detection of no power supply glitch attack.

Similarly, measured current values measured by the current measurement circuit 13B in the content data transmission period P4 are converted from analog to digital form by the ADC 26B, and then stored in the measured value storing memory 25. The detection unit 31 sequentially compares the measured current values in the content data transmission period P4 with the thresholds L2 and H2 stored in the threshold storing memory 24. Measured current values smaller than the threshold L2 or larger than the threshold H2 represent detection of a power supply glitch attack on the encryption-decryption processor 42 of the memory device 3, while measured current values larger than or equal to the threshold L2 and smaller than or equal to the threshold H2 represent detection of no power supply glitch attack.

Processing after the detection unit 31 detects a power supply glitch in the host device 2 or the memory device 3 is the same as in Embodiment 1. In the present embodiment, however, a below-described authentication protocols can be employed in place of, or in addition to, authentication using modern encryption, for verifying authenticity of the memory device 3 by the authentication unit 33.

Figure 10:
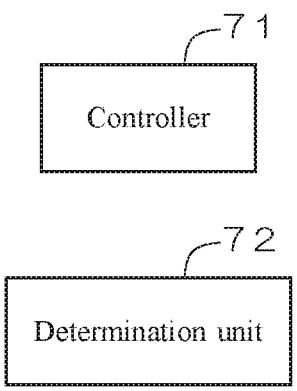
FIG. 10 is a diagram illustrating functions of an authentication unit.

FIG. 10 is a diagram illustrating functions of the authentication unit 33. As illustrated in FIG. 10, the authentication unit 33 serves as a controller 71 and a determination unit 72.

Figure 11:
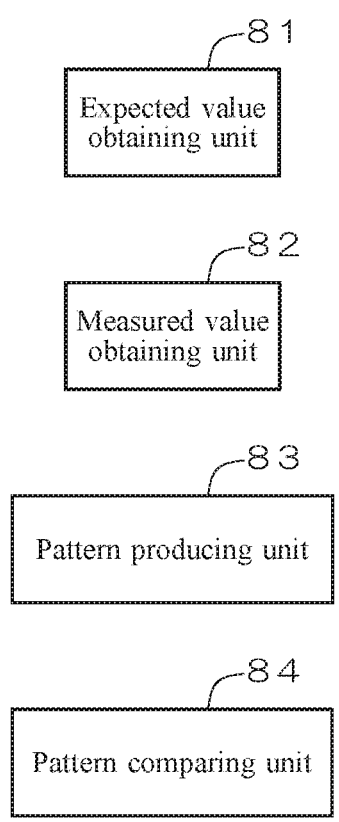
FIG. 11 is a diagram illustrating functions of a determination unit.

FIG. 11 a diagram illustrating functions of the deter nation unit 72. As illustrated in FIG. 11, the determination unit 72 serves as an expected value obtaining unit 81, a measured value obtaining unit 82, a pattern producing unit 83, and a pattern comparing unit 84.

Figure 12:
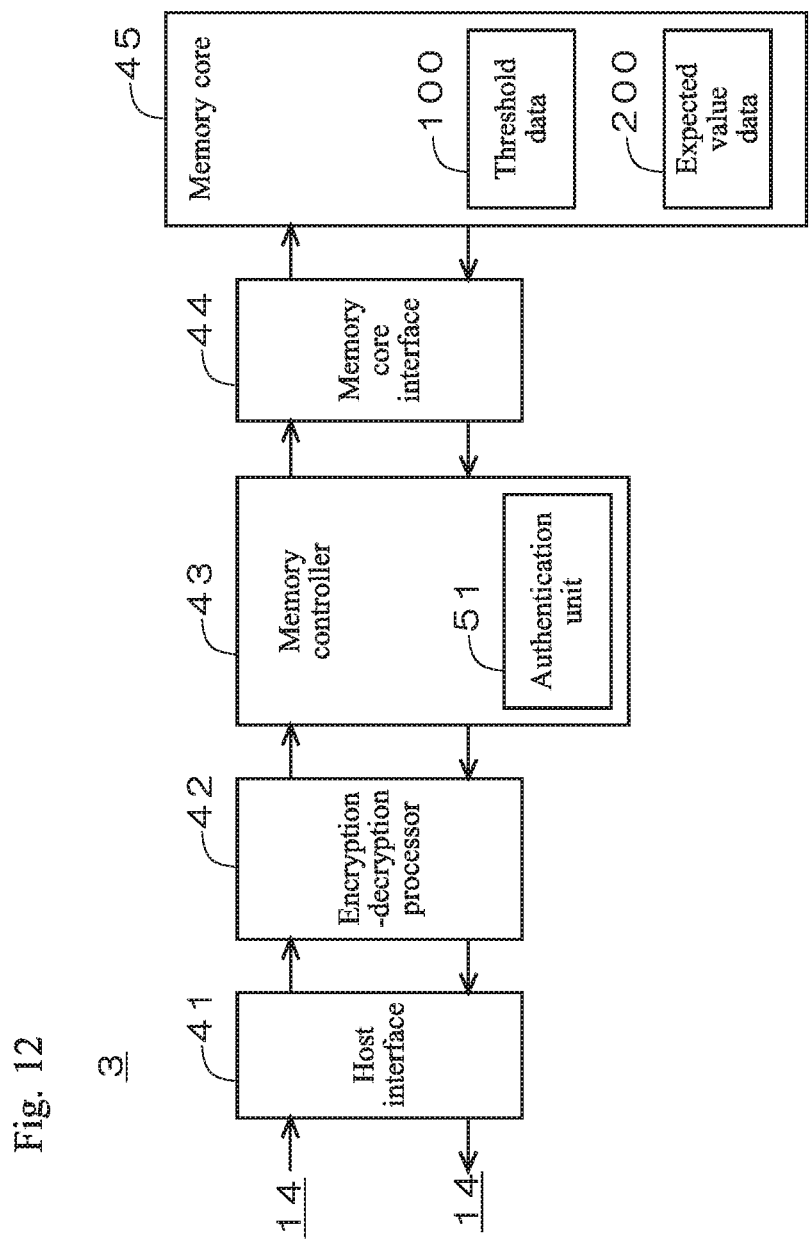
FIG. 12 is a simplified diagram illustrating a configuration of the memory device.

FIG. 12 is a simplified diagram illustrating a configuration of the memory device 3. The memory core 45 retains expected value data 200 at its specific address area.

Authorized memory devices 3 noticeably differ from unauthorized products in current consumption characteristics, due to differences in the structure, the manufacturing process, and the like of semiconductor devices. In the host device 2 according to the present embodiment, the controller 71 causes the memory device 3 to perform a predetermined power consumption operation for authentication of the memory device 3 in addition to the normal operation. The determination unit 72 determines whether the memory device 3 is an authorized or an unauthorized product, on the basis of measured current values measured by the current measurement circuit 13B in a period in Which the memory device 3 performs a power consumption operation and a known reference current value which is a current value in a power consumption operation by an authorized memory device 3. The details are as follows.

The controller 71 in the host device 2 causes the memory controller 43 in the memory device 3 to perform a predetermined power consumption operation for authentication of the memory device 3. More specifically, a specific logic circuit among multiple logic circuits of the memory controller 43 is caused to perform a preset specific operation to generate consumed power due to the specific operation. The specific logic circuit as a target for the power consumption operation preferably has such current consumption due to the specific operation that is relatively large in value and changes distinctively.

Authorized memory devices 3, for which the types of semiconductor devices to be implemented and the manufacturing processes of each device are strictly controlled, would show almost consistent current consumption characteristics when the specific logic circuit performs the specific operation by the power consumption operation. Thus information on the current consumption characteristics due to a power consumption operation is produced before factory shipments, and stored as encrypted expected value data 200 in the specific address area of the memory core 45 (see FIG. 11). In the example according to the present embodiment, a transitional pattern (reference current value pattern) of the values of current consumption obtained by sampling the values of current consumption due to the power consumption operation at a predetermined sampling frequency is stored as the expected value data 200 in the memory core 45.

Figure 13:
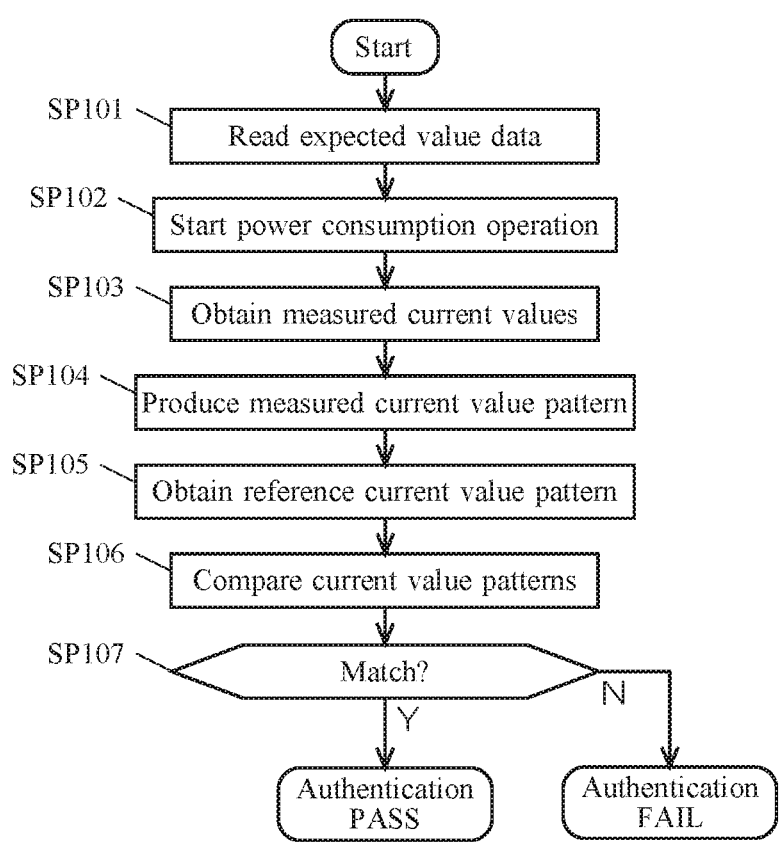
FIG. 13 is a flow chart illustrating authentication of the memory device by the host device.

FIG. 13 is a flow chart illustrating authentication of the memory device 3 by the host device 2. In Step SP101, the controller 71 issues a read command to read the expected value data 200 from the memory device 3, and sets the command buffer 27 with the read command. The read command is sent from the command buffer 27 via the memory interface 14 to the memory device 3. The host interface 41 inputs the read command received from the host device 2 to the memory controller 43. The memory controller 43 decodes the received read command to input the read address of the expected value data 200 to the memory core interface 44. The read address is input from the memory core interface 44 to the memory core 45, and thereby the expected value data 200 is read from the memory core 45. In the example according to the present embodiment, the reference current value pattern of an authorized product and data on a predetermined tolerance are read as the expected value data 200 from the memory core 45. The tolerance has an optimal value within a range of plus or minus several to ten-odd percent, set in advance depending on, for example, the way current values are distributed in the reference current value pattern. The read expected value data 200 is sent as encrypted via the memory core interface 44 and the host interface 41 to the host device 2. The memory interface 14 stores the expected value data 200 received from the memory device 3 in the data buffer 28. The controller 71 transfers the expected value data 200 stored in the data buffer 28 to the encryption-decryption processor 23, and the encryption-decryption processor 23 decrypts the encrypted expected value data 200. The controller 71 transfers the decrypted expected value data 200 to the expected value storing memory 61. By the above processes, data on the reference current value pattern and the tolerance are stored in the expected value storing memory 61. Then the controller 71 drives the ADC 26B.

In Step SP102, the controller 71 issues a control command for causing a power consumption operation, and sets the command buffer 27 with the control command. The control command is for causing a specific logic circuit among multiple logic circuits of the memory controller 43 to perform a preset specific operation. The control command also designates a period in which this specific operation is to be performed. For example, the period designated as one for performing the specific operation is a "standby period." The control command is sent from the command buffer 27 via the memory interface 14 to the memory device 3. The host interface 41 inputs the control command received from the host device 2 to the memory controller 43. The memory controller 43 decodes the received control command and inputs a control instruction to cause the specific operation designated by the control command to the specific logic circuit designated by the control command. The specific logic circuit recognizes that the memory device 3 has entered the standby period by a chip select signal being negated, and starts the specific operation instructed by the control instruction. The specific operation (i.e., power consumption operation) is performed in the background in the standby period of the memory device 3.

In Step SP103, the measured value obtaining unit 82 obtains the measured current values. The details are as follows. When the memory device 3 starts the power consumption operation, a current due to the operation passes from the power supply unit 123 of the host device 2 via the resistance element RB to the memory device 3. The current measurement circuit 13B samples the voltage between both ends of the resistance element RB at a predetermined sampling frequency (for example, one to several megahertz), to measure the values of the current passing from the power supply unit 123 to the memory device 3. The measured current values are converted from analog to digital form by the ADC 26B. The controller 71 stores the measured current values converted into digital values in the measured value storing memory 62. The measured value obtaining unit 82 obtains the measured current values stored in the measured value storing memory 62 from the measured value storing memory 62.

In Step SP104, the pattern producing unit 83 chronologically arranges the measured current values obtained by the measured value obtaining unit 82, to produce a measured current value pattern.

In Step SP105, the expected value obtaining unit 81 obtains the reference current value pattern and the data on the tolerance from the expected value storing memory 61.

In Step SP106, the pattern comparing unit 84 compares the measured current value pattern produced by the pattern producing unit 83 with the reference current value pattern obtained by the expected value obtaining unit 81.

Figure 14:
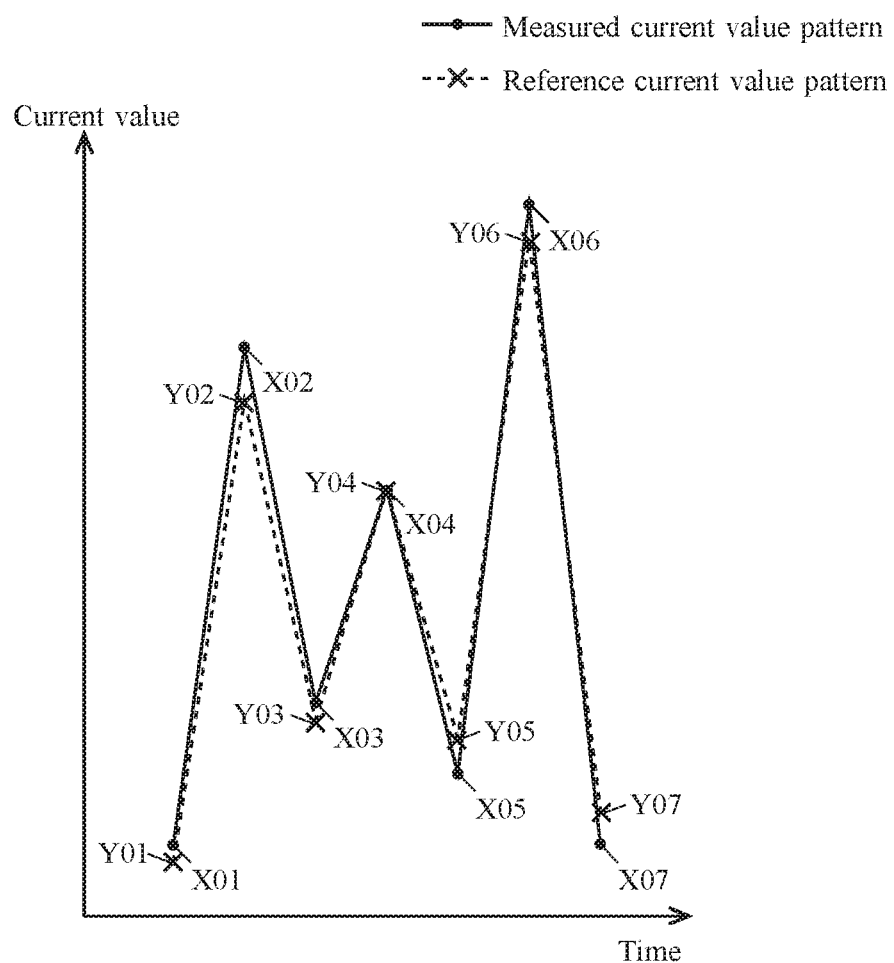
FIG. 14 is a diagram illustrating an example of a measured current value pattern and a reference current value pattern.

FIG. 14 is a diagram illustrating an example of the measured current value pattern and the reference current value pattern. When the sampling frequency of the current measurement circuit 13B is one to several megahertz and the length of the target period of measurement is several to several dozen milliseconds, the measured current value pattern and the reference current value pattern actually include several hundred thousand to several million current vales each. FIG. 14 illustrates, in order to facilitate the description, the measured current value pattern and the reference current value pattern including seven measured current values X01 to X07 and reference current values Y01 to Y07, respectively. The pattern comparing unit 84 compares the differences between the corresponding measured current values X01 to X07 and reference current values Y01 to Y07 with the tolerance obtained by the expected value obtaining unit 81.

In Step SP107, the pattern comparing unit 84 determines whether the differences between the measured current values X01 to X07 and the reference current values Y01 to Y07 are all smaller than or equal to the tolerance. If all of the differences are smaller than or equal to the tolerance (i.e., a perfect match), the pattern comparing unit 84 determines that the memory device 3 connected to the host device 2 is an authorized product. In the example illustrated in FIG. 14, the measured current values X01 to X07 perfectly match the reference current values Y01 to Y07, and thus the memory device 3 is determined to be an authorized product.

If at least one of the differences exceeds the tolerance (i.e., no perfect match), the pattern comparing unit 84 determines that the memory device 3 connected to the host device 2 is an unauthorized product.

In the memory system 1 according to the present embodiment, the current measurement circuit 13A (first current measurement unit) measures a current that passes from the power supply unit 12A (first power supply unit) to the SoC 11 and the detection unit 31 detects a power supply glitch in the host device 2, on the basis of a result of current measurement by the current measurement circuit 13A. This enables simplified and reliable detection of a power supply glitch in the host device 2. The controller 32 performs countermeasure processing against a fault attack if the detection unit 31 detects a power supply glitch in the host device 2. Since the countermeasure processing against a fault attack is not performed if the detection unit 31 detects no power supply glitch in the host device 2, increase in processing latency and degradation in system performance of the memory system 1 that would be otherwise caused by always running the countermeasure processing are effectively avoided. The controller 32 suspends transmission of encrypted data from the host device 2 to the memory device 3 if a power supply glitch in the host device 2 is detected. This effectively prevents an attacker from retrieving a false encrypted command for fault attack analysis.

In the memory system 1 according to the present embodiment, the controller 32 continues to suspend transmission of an encrypted command from the host device 2 to the memory device 3 while the detection unit 31 detects a power supply glitch in the host device 2. This reliably prevents an attacker from retrieving a false encrypted command for fault attack analysis, even when the power supply glitch is repeated for a fault attack.

In the memory system 1 according to the present embodiment, the controller 32 causes the authentication unit 33 to perform authentication after the detection unit 31 detects a power supply glitch in the host device 2. This effectively makes a fault attack by an attacker more difficult, since the attacker needs to break through authentication by the authentication unit 33 in order to restart transmission of an encrypted command from the host device 2 to the memory device 3 to retrieve a false encrypted command.

In the memory system 1 according to the present embodiment, the authentication unit 33 causes the memory device 3 to perform a predetermined power consumption operation for authentication of the memory device 3 in addition to the normal operation, and verifies authenticity of the memory device 3, on the basis of the measured current values measured by the current measurement circuit 13B in a period in which the memory device 3 performs the power consumption operation and known reference current values which are current values in the power consumption operation by an authorized memory device 3. When an unauthorized memory device 3 is not able to perform the power consumption operation, the measured current values do not match the reference current values, and thus authentication of the memory device 3 is readily performable by the authentication unit 33. Even when an unauthorized memory device 3 is able to perform the power consumption operation, since an authorized and an unauthorized product have different power consumption characteristics due to differences in the device structure, the manufacturing process, and the like, the measured current values of the unauthorized product do not match the reference current values of the authorized product. Thus authentication of the memory device 3 is readily performable by the authentication unit 33. Moreover, since the power consumption operation for authentication of the memory device 3 is not the normal operation of the memory device 3 but an independent operation added to the normal operation, the memory device 3 can be caused to perform any arbitrary power consumption operation having noticeable current consumption values or current consumption values that change noticeably. In consequence, accuracy in authentication of the memory device 3 by the authentication unit 33 is improved.

In the memory system 1 according to the present embodiment, the pattern comparing unit 84 compares the measured current value pattern produced by the pattern producing unit 83 with a known reference current value pattern having chronologically arranged reference current values. The authentication unit 33 verifies authenticity of the memory device 3 on the basis of a comparison result by the pattern comparing unit 84. Since unauthorized products tend to be inferior, absolute values of current consumption of unauthorized products are often larger than those of authorized products. In the memory system 1 according to the present embodiment, the authentication unit 33 compares the measured current value pattern, rather than a pattern of rates of change in current consumption, with the reference current value pattern. This achieves highly accurate authentication of the memory device 3, even when an authorized and unauthorized product have a similar pattern of rages of change in current consumption.

In the memory system 1 according to the present embodiment, the controller 32 restarts transmission of an encrypted command from the host device 2 to the memory device 3, if the detection unit 31 detects no power supply glitch in the host device 2 and authentication by the authentication unit 33 is successful. Thus the system availability is improved, since the normal operation of the memory system 1 is restarted when a fault attack ceases, subject to successful authentication by the authentication unit 33. When a power supply glitch in the host device 2 detected is due to abrupt noise such as static electricity, the normal operation of the memory system 1 is restarted, subject to successful authentication by the authentication unit 33, and thus the system availability is improved.

In the memory system 1 according to the present embodiment, the current measurement circuit 13B measures a current that passes from the power supply unit 12B to the memory device 3, and the detection unit 31 detects a power supply glitch in the memory device 3, on the basis of a result of current measurement by the current measurement circuit 13B. This enables simplified and reliable detection of a power supply glitch in the memory device 3. The controller 32 performs countermeasure processing against a fault attack if the detection unit 31 detects a power supply glitch in the memory device 3. Since the countermeasure processing against a fault attack is not performed if the detection unit 31 detects no power supply glitch in the memory device 3, increase in processing latency and degradation in system performance of the memory system 1 that would be otherwise caused by always running the countermeasure processing are effectively avoided. The controller 32 suspends transmission of an encrypted content data from the memory device 3 to the host device 2 if a power supply glitch in the memory device 3 is detected. This effectively prevents an attacker from retrieving a false encrypted content data for fault attack analysis.

In the memory system 1 according to the present embodiment, the controller 32 continues to suspend transmission of encrypted content data from the memory device 3 to the host device 2 while the detection unit 31 detects a power supply glitch in the memory device 3. This reliably prevents an attacker from retrieving a false encrypted content data for fault attack analysis, even when the power supply glitch is repeated for a fault attack.

In the memory system 1 according to the present embodiment, the controller 32 causes the authentication unit 51 to perform authentication after the detection unit 31 detects a power supply glitch in the memory device 3. This effectively makes a fault attack by an attacker more difficult, since the attacker needs to break through authentication by the authentication unit 51 in order to restart transmission of encrypted content data from the memory device 3 to the host device 2 to retrieve false encrypted content data.

In the memory system 1 according to the present embodiment, the controller 32 restarts transmission of encrypted content data from the memory device 3 to the host device 2, if the detection unit 31 detects no power supply glitch in the memory device 3 and authentication by the authentication unit 51 is successful. Thus the system availability is improved, since the normal operation of the memory system 1 is restarted when a fault attack ceases, subject to successful authentication by the authentication unit 51. When a power supply glitch in the memory device 3 detected is due to abrupt noise such as static electricity, the normal operation of the memory system 1 is restarted, subject to successful authentication by the authentication unit 51, and thus the system availability is improved.

In the present embodiment, as well as in the configuration illustrated in FIG. 8, the SoC 11 and the SoC controller 90 may be provided on separate dice. In such configuration, the ADCs 26A and 26B, the detection unit 31, the controller 32, the authentication unit 33, the threshold storing memory 24, the measured value storing memory 25, the expected value storing memory 61, and the measured value storing memory 62 are provided in the SoC controller 90. Moreover, the current measurement circuits 13A and 13B may be provided in the SoC controller 90. When the detection unit 31 detects a power supply glitch in the host device 2, the controller 32 suspends output of an encrypted command from at least one of the encryption-decryption processor 23, the command buffer 27, and the memory interface 14, or suspends the whole operation of the SoC 11, so as to immediately suspend transmission of the encrypted command from the host device 2 to the memory device 3.

While the invention has been described in detail, the foregoing description is in all aspects illustrative and not restrictive. It is understood that numerous other modifications and variations can be devised without departing from the scope of the invention.

What is claimed is:

1. An information processing system comprising:
an information processing device including a memory configured to store a computer program and first circuitry configured to perform first encryption-decryption in response to executing the computer program stored in the memory, and
an appurtenance device connected to the information processing device and including second circuitry configured to perform second encryption-decryption,
wherein the information processing device further including:
a first power supply circuit configured to supply power to the first circuitry, and
a first current measurement circuit configured to measure a current from the first power supply circuit to the first circuitry,
wherein the first circuitry being further configured to:
detect a power supply glitch in the information processing device based on a result of current measurement by the first current measurement circuit, and
if a power supply glitch in the information processing device is detected, suspend transmission of encrypted data from the information processing device to the appurtenance device,
wherein the first circuitry is configured to continue to suspend transmission of encrypted data from the information processing device to the appurtenance device while a power supply glitch in the information processing device is detected,
wherein the first circuitry is configured to perform authentication to verify authenticity of the appurtenance device, after a power supply glitch in the information processing device is detected,
wherein the first circuitry is configured to restart transmission of encrypted data from the information processing device to the appurtenance device, if no power supply glitch in the information processing device is detected after transmission of encrypted data from the information processsing device to the appurtenance device is suspended, and the authentication is successful.

2. The information processing system according to claim 1, wherein:
the information processing device further includes:
a second power supply circuit configured to supply power to the appurtenance device, and
a second current measurement circuit configured to measure a current from the second power supply circuit to the appurtenance device, and
the first circuitry is configured to:
cause the appurtenance device to perform a predetermined power consumption operation for authentication of the appurtenance device in addition to a normal operation, and
verify authenticity of the appurtenance device, based on a measured current value measured by the second current measurement circuit in a period in which the appurtenance device performs the power consumption operation and a reference current value that is a current value in the power consumption operation by the appurtenance device that is authorized.

3. The information processing system according to claim 2, wherein:
the first circuitry is configured to:
chronologically arrange a plurality of measured current values measured by the second current measurement circuit to produce a measured current value pattern,
compare the produced measured current value pattern with a reference current value pattern having chronologically arranged reference current values, and
verify authenticity of the appurtenance device based on a comparison result.

4. The information processing system according to claim 2, wherein:
the first circuitry is further configured to:
detect a power supply glitch in the appurtenance device based on a result of current measurement by the second current measurement circuit, and
if a power supply glitch in the appurtenance device is detected, suspend transmission of encrypted data from the appurtenance device to the information processing device.

5. The information processing system according to claim 4, wherein:
the first circuitry is further configured to continue to suspend transmission of encrypted data from the appurtenance device to the information processing device while a power supply glitch in the appurtenance device is detected.

6. The information processing system according to claim 5, wherein:
the second circuitry is further configured to perform authentication to verify authenticity of the information processing device, and
the first circuitry is configured to cause the second circuitry to perform authentication after a power supply glitch in the appurtenance device is detected.

7. The information processing system according to claim 6, wherein:
the first circuitry is configured to restart transmission of encrypted data from the appurtenance device to the information processing device, if no power supply glitch in the appurtenance device is detected after transmission of encrypted data from the appurtenance device to the information processing device is suspended, and authentication by the second circuitry is successful.

8. The information processing system according to claim 1,
wherein the first circuitry is further configured to detect a power supply glitch in the information processing device based on a result of current measurement by the first current measurement circuit and a first set of thresholds for detecting the power supply glitch in the information processing device,
wherein the first set of thresholds is set and encrypted by the appurtenance device,
wherein, in advance to detecting the power supply glitch, the first circuitry is configured to retrieve the first set of thresholds and decrypt the first set of thresholds.

9. The information processing system according to claim 8,
wherein the first set of thresholds includes a first lower threshold and a first higher threshold, the first lower threshold being set to a value which is smaller than a minimum current from the first power supply circuit to the first circuitry and the first higher threshold being set to a value which is lager than a maximum current from the first power supply circuit to the first circuitry.

10. The information processing system according to claim 8,
wherein the first set of thresholds is set before factory shipment and stored in a second memory of the appurtenance device.

11. An information processing system comprising:
an information processing device including a memory configured to store a computer program and first circuitry configured to perform first encryption-decryption in response to executing the computer program stored in the memory, and
an appurtenance device connected to the information processing device and including second circuitry configured to perform second encryption-decryption,
wherein the information processing device further including:
a power supply circuit configured to supply power to the appurtenance device, and
a current measurement circuit configured to measure a current from the power supply circuit to the appurtenance device,
wherein the first circuitry being further configured to:
detect a power supply glitch in the appurtenance device based on a result of current measurement by the current measurement circuit, and
if a power supply glitch in the appurtenance device is detected, suspend transmission of encrypted data from the appurtenance device to the information processing device,
wherein the first circuitry is configured to continue to suspend transmission of encrypted data from the appurtenance device to the information processing device while a power supply glitch in the appurtenance device is detected,
wherein the second circuitry is further configured to perform authentication to verify authenticity of the information processing device, and
wherein the first circuitry is configured to cause the second circuitry to perform authentication after a power supply glitch in the appurtenance device is detected,
wherein the first circuitry is configured to restart transmission of encrypted data from the appurtenance device to the information processing device, if no power supply glitch in the appurtenance device is detected after transmission of encrypted data from the appurtenance device to the information processing device is suspended, and authentication by the second circuitry is successful.

12. The information processing system according to claim 11,
wherein the first circuitry is further configured to detect a power supply glitch in the information processing device based on a result of current measurement by the current measurement circuit and a second set of thresholds for detecting the power supply glitch in the appurtenance device,
wherein the second set of thresholds is set and encrypted by the appurtenance device,
wherein, in advance to detecting the power supply glitch, the first circuitry is configured to retrieve the second set of thresholds and decrypt the second set of thresholds.

13. The information processing system according to claim 12,
wherein the second set of thresholds includes a second lower threshold and a second higher threshold, the second lower threshold being set to a value which is smaller than a minimum current from the power supply circuit to the appurtenance device and the second higher threshold being set to a value which is larger than a maximum current from the power supply circuit to the appurtenance device.

14. The information processing system according to claim 12,
wherein the second set of thresholds is set before factory shipment and stored in a second memory of the appurtenance device.

15. An information processing system comprising: an information processing device including a memory configured to store a computer program and first circuitry configured to perform first encryption-decryption in response to executing the computer program stored in the memory, and
an appurtenance device connected to the information processing device and including second circuitry configured to perform second encryption-decryption,
wherein the information processing device further including; a power supply circuit configured to supply power to the first circuitry and the appurtenance device, and
a current measurement circuit configured to measure a current from the power supply circuit to the first circuitry and the appurtenance device,
wherein the first circuitry being further configured to; detect a power supply glitch in the information processing device and the appurtenance device based on a result of current measurement by the current measurement circuit, and
if a power supply glitch in the information processing device is detected, suspend transmission of encrypted data from the information processing device to the appurtenance device, and if a power supply glitch in the appurtenance device is detected, suspend transmission of encrypted data from the appurtenance device to the information processing device,
wherein the first circuitry is configured to continue to suspend transmission of encrypted data from the information processing device to the appurtenance device while a power supply glitch in the information processing device is detected,
wherein the first circuitry is configured to continue to suspend transmission of encrypted data from the appurtenance device to the information processing device while a power supply glitch in the appurtenance device is detected,
wherein the first circuitry is further configured to perform authentication to verify authenticity of the appurtenance device,
wherein the second circuitry is further configured to perform authentication to verify authenticity of the information processing device, and
wherein the first circuitry is configured to perform authentication after a power supply glitch in the information processing device is detected and cause the second circuitry to perform authentication after a power supply glitch in the appurtenance device is detected,
wherein the first circuitry is configured to restart transmission of encrypted data from the information processing device to the appurtenance device, if no power supply glitch in the information processing device is detected after transmission of encrypted data from the information processing device to the appurtenance device is suspended, and authentication by the first circuitry is successful, and wherein the first circuitry is configured to restart transmission of encrypted data from the appurtenance device to the information processing device, if no power supply glitch in the appurtenance device is detected after transmission of encrypted data from the appurtenance device to the information processing device is suspended, and authentication by the second circuitry is successful.

16. The information processing system according to claim 15, wherein the first circuitry is further configured to detect a power supply glitch in the information processing device and the appurtenance device based on a result of current measurement by the current measurement circuit and a first set of thresholds for detecting the power supply glitch in the information processing device and a second set of thresholds for detecting the power supply glitch in the appurtenance device,
wherein the first set of thresholds and the second set of thresholds are set and encrypted by the appurtenance device,
wherein, in advance to detecting the power supply glitch, the first circuitry is configured to retrieve the first set of thresholds and the second set of thresholds and decrypt the first set of thresholds and the second set of thresholds.

17. The information processing system according to claim 16,
wherein the first set of thresholds includes a first lower threshold and a first higher threshold, the first lower threshold being se to a value which is smaller than a minimum current from the first power supply circuit to the first circuitry and the first higher threshold being set to a value which is larger than a maximum current from the first power supply circuit to the first circuitry,
wherein the second set of thresholds includes a second lower threshold and a second higher threshold, the second lower threshold being set to a value which is smaller than a minimum current from the power supply circuit to the appurtenance device and the second higher threshold being set to a value which is larger than a maximum current from the power supply circuit to the appurtenance device.

18. The information processing system according to claim 16,
wherein the first set of thresholds and the second set of thresholds are set before factory shipment and stored in a second memory of the appurtenance device.

19. A method for controlling an information processing device, the method comprising:
supplying power from a power supply circuit to circuitry of the information processing device, the circuitry being configured to perform first encryption-decryption in response to executing a computer program stored in a memory;
measuring a current from the power supply circuit to the circuitry;
detecting a power supply glitch in the information processing device based on a result of the measuring the current;
suspending transmission of encrypted data from the information processing device to the appurtenance device if a power supply glitch in the information processing device is detected in the detecting;
continuing to suspend transmission of encrypted data from the information processing device to the appurtenance device while a power supply glitch in the information processing device is detected;
performing authentication to verify authenticity of the appurtenance device, after a power supply glitch in the information processing device is detected; and
restarting transmission of encrypted data from the information processing device to the appurtenance device, if no power supply glitch in the information processing device is detected after transmission of encrypted data from the information processing device to the appurtenance device is suspended, and the authentication is successful.

20. A method for controlling an information processing device, the method comprising:
supplying power from a power supply circuit to an appurtenance device connected to the information processing device, the information processing device including circuitry being configured to perform first encryption-decryption in response to executing a computer program stored in a memory, and the appurtenance device being configured to perform second encryption-decryption;
measuring a current from the power supply circuit to the appurtenance device;
detecting a power supply glitch in the appurtenance device based on a result of the measuring the current;
suspending transmission of encrypted data from the appurtenance device to the information processing device if a power supply glitch in the appurtenance device is detected in the detecting;
continuing to suspend transmission of encrypted data from the appurtenance device to the information processing device while a power supply glitch in the appurtenance device is detected;
causing the second circuitry to perform authentication to verify authenticity of the information processing device, after a power supply glitch in the appurtenance device is detected; and
restarting transmission of encrypted data from the appurtenance device to the information processing device, if no power supply glitch in the appurtenance device is detected after transmission of encrypted data from the appurtenance device to the information processing device is suspended, and authentication by the second circuitry is successful.

21. A method for controlling an information processing device, the method comprising:
supplying power from a power supply circuit to circuitry and an appurtenance device, the circuitry being configured to perform a first encryption-decryption in response to executing a computer program stored in a memory, and the appurtenance device being configured to perform second encryption-decryption;
measuring a current from the power supply circuit to the circuitry and the appurtenance device;
detecting a power supply glitch in the information processing device and the appurtenance device based on a result of the measuring the current;
suspending transmission of encrypted data from the information processing device to the appurtenance device if a power supply glitch in the information processing device is detected in the detecting, and suspending transmission of encrypted data from the appurtenance device to the information processing device if a power supply glitch in the appurtenance device is detected in the detecting,
continuing to suspend transmission of encrypted data from the information processing device to the appurtenance device while a power supply glitch in the information processing device is detected, continuing to suspend transmission of encrypted data from the appurtenance device to the information processing device while a power supply glitch in the appurtenance device is detected, performing authentication to verify authenticity of the appurtenance device, performing authentication after a power supply glitch in the information processing device is detected, causing the second circuitry to perform authentication after a power supply glitch in the appurtenance device is detected, restarting transmission of encrypted data from the information processing device to the appurtenance device, if no power supply glitch in the information processing device is detected after transmission of encrypted data from the information processing device to the appurtenance device is suspended, and authentication by the first circuitry is successful, and restarting transmission of encrypted data from the appurtenance device to the information processing device, if no power supply glitch m the appurtenance device is detected after transmission of encrypted data from the appurtenance device to the information processing device is suspended, and authentication by the second circuitry is successful.

* * * * *